(12) United States Patent
Beech et al.

(10) Patent No.: US 7,259,287 B2
(45) Date of Patent: Aug. 21, 2007

(54) METHOD OF STARTING UP A REACTION SYSTEM

(75) Inventors: James H. Beech, Kingwood, TX (US); Richard E. Walter, Long Valley, NJ (US); Shun Chong Fung, Bridgewater, NJ (US); Peter N. Loezos, Houston, TX (US); Marcel Johannes Janssen, Kessel-Lo (BE); Luc Roger Marc Martens, Meise (BE); Kenneth Ray Clem, Humble, TX (US); Stephen Neil Vaughn, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 714 days.

(21) Appl. No.: 10/641,718

(22) Filed: Aug. 15, 2003

(65) Prior Publication Data

US 2005/0038306 A1    Feb. 17, 2005

(51) Int. Cl.
    *C07C 1/00*    (2006.01)
(52) U.S. Cl. ............... 585/640; 585/638; 585/639; 585/951
(58) Field of Classification Search ........ 585/639–640, 585/951
    See application file for complete search history.

(56) References Cited

U.S. PATENT DOCUMENTS

| | | | |
|---|---|---|---|
| 3,909,396 A | 9/1975 | O'Hara | |
| 4,764,269 A | 8/1988 | Edwards et al. | 208/120 |
| 4,939,314 A * | 7/1990 | Harandi et al. | 585/533 |
| 6,023,005 A * | 2/2000 | Lattner et al. | 585/639 |
| 6,316,683 B1 | 11/2001 | Janssen et al. | 585/640 |
| 2003/0004056 A1 | 1/2003 | Mees et al. | |

FOREIGN PATENT DOCUMENTS

| EP | 0 230 005 | 7/1987 |
|---|---|---|
| WO | WO 00/74848 A1 * | 12/2000 |

OTHER PUBLICATIONS

Tao et al., "Use of dry gas, nitrogen improves FCCU reactor pressure control," *Oil & Gas Journal*, pp. 68-72, (Nov. 8, 1999).
Chester et al., "Steam Deactivation Kinetics of Zeolitic Cracking Catalysts," *Ind. Eng. Chem., Prod. Res. Dev.*, vol. 16, No. 4, pp. 285-290, (1977).
Barger et al., "Hydrothermal Stability of SAPO-34 in the Methanol-to-Olefins Process," *Arabian J. Sci. Eng.*, vol. 21 (2), pp. 263-271, (1996).

* cited by examiner

*Primary Examiner*—Glenn Caldarola
*Assistant Examiner*—In Suk Bullock

(57) ABSTRACT

The invention is directed to methods of starting up reaction systems. The reaction systems are those that use catalysts that comprise molecular sieves, particularly metalloaluminophosphate molecular sieves, especially metalloaluminophosphate molecular sieves which are susceptible to loss of catalytic activity due to contact with water molecules. The methods provide appropriate mechanisms of heating and loading the activated molecular sieves to protect against loss of catalytic activity that can occur due to contact with water molecules.

66 Claims, 4 Drawing Sheets

METHOD OF STARTING UP A REACTION SYSTEM

FIELD OF THE INVENTION

This invention relates to processes or methods of starting up reaction systems. In particular, this invention relates to processes or methods of starting up reaction systems, while maintaining or protecting the catalytic activity of molecular sieves that are susceptible to loss of catalytic activity due to contact with water molecules.

BACKGROUND OF THE INVENTION

Molecular sieves are generally derived from alumina silicate materials and contain a pore system, which is a network of uniform pores and empty cavities. These pores and cavities catch molecules that have a size equal to or less than the size of the pores and cavities, and repel molecules of a larger size.

The pores and cavities of molecular sieves are formed as a result of adding template materials during the molecular sieve manufacturing process. During the formation of the molecular sieves themselves, a lattice type chemical structure is formed from the alumina silicate type materials. This lattice type structure essentially wraps around the template material, with the template material acting as a means of forming the pore structure within the molecular sieve. The resulting molecular sieve may be combined with other components for the benefit of adjusting various properties of the molecular sieve or to form larger particles.

To make the molecular sieve suitable for use, the template must be removed so that the pores and cavities are open to catch molecules, either for the purpose of adsorbing the molecules from the environment or to react the molecules to form a desired product. The reaction occurs when the molecules come into contact with catalytic sites located within the pore system, particularly within one or more of the empty cavities or cages as sometimes called.

The template is conventionally removed from the molecular sieve by calcining or burning out the template. An elution process can also be used to remove the template, although calcination is preferred. Once the template is removed, the molecular sieve is considered to be activated or ready for use. The activated molecular sieve has its pore system, including the empty cavities or cages open to the immediate environment, and ready for use.

Activated metalloaluminophosphate molecular sieves that have catalytic sites within their microporous structure, e.g., silicoaluminophosphate (SAPO) molecular sieves, have been found to be sensitive to moisture. In general, significant exposure of the activated molecular sieves to moisture has been found to deactivate the catalytic activity of the molecular sieves. Unfortunately, methods of protecting activated metalloaluminophosphate molecular sieves against the harmful effects of moisture are limited.

U.S. Pat. No. 6,316,683 B1 (Janssen et al.) discloses a method of protecting catalytic activity of a SAPO molecular sieve by shielding the internal active sites of the molecular sieve from contact with moisture. The template itself can serve as the shield, or an anhydrous blanket can serve as a shield for an activated sieve that does not include template. It is desirable to shield the active sites, because activated SAPO molecular sieves will exhibit a loss of catalytic activity when exposed to moisture.

U.S. Pat. No. 4,764,269 (Edwards et al.) discloses a method of protecting SAPO-37 catalyst from deactivating as a result of contact with moisture. The catalyst is maintained under storage conditions such that the organic template component of the molecular sieve is retained in the SAPO-37 molecular sieve, until such time as the catalyst is placed into a catalytic cracking unit. When the catalyst is exposed to the FCC reaction conditions, wherein the reactor is operated at 400° to 600° C. and the regenerator operated at about 600° to 850° C., the organic template is removed from the molecular sieve pore structure, and the catalyst becomes activated for the cracking of hydrocarbons. According to this procedure, there is little if any contact with moisture.

Mees et al., "Improvement of the Hydrothermal Stability of SAPO-34," *Chem. Commun.*, 2003, (1), 44-45, first published as an advance article on the web Nov. 22, 2002, discloses a method of protecting SAPO-34 molecular sieve, based on a reversible reaction of $NH_3$ with acid sites of the sieve. The method transforms a $H^+$-SAPO-34 into an $NH_4^+$-SAPO-34 in reversible way. The $NH_4^+$-SAPO-34 is said to be able to withstand severe steaming for an extended period of time without loss of structural integrity and acidity.

As new large scale, commercial production facilities, which use molecular sieves in the production process, continue to be implemented, protecting the activated molecular sieves from loss of catalytic activity as a result of contact with moisture continues to become an even greater challenge. It is a particular challenge in catalytic reaction systems where large scale operation will entail contacting the activated molecular sieve with water vapor, particularly at times of unit start up. During such times, it may be necessary to use steam to heat the reaction system. However, contact of the activated sieve with water vapor can result in sieve that has little to no catalytic activity, which means that the sieve would then be of essentially no commercial value. It is, therefore, important that methods of starting up reaction systems that incorporate the use of molecular sieves susceptible to loss of catalytic activity due to contact with water molecules be developed.

SUMMARY OF THE INVENTION

In one aspect, this invention provides methods that assist in the protection of molecular sieves against loss of catalytic activity in starting up a reaction system. These methods are particularly effective under certain conditions where activated molecular sieve is contacted with water vapor or steam during reaction system start up.

In one aspect of the invention, there is provided a process of starting up a reaction system. The process comprises heating at least a portion of the reaction system. After the portion of the system is heated, a catalyst comprising activated metalloaluminophosphate molecular sieve is loaded into the heated portion. The loaded catalyst is further heated, and the further heated catalyst is contacted with feed. In one embodiment, the reaction system is a dense bed reaction system, fixed bed reaction system, fluidized bed reaction system, fast fluidized bed reaction system, circulating fluidized bed reaction system, or riser reactor system.

In one embodiment the reaction system comprises a reactor and regenerator. Preferably, the catalyst is loaded into the regenerator, further heated in the regenerator, and circulated to the reactor prior to contacting with feed. The reactor is suitably a hot wall or cold wall reactor.

The invention further provides a process of starting up a reactor system having a reactor and regenerator. The reactor and regenerator are heated, and catalyst comprising activated metalloaluminophosphate molecular sieve is loaded into the heated reactor or regenerator. The catalyst loaded into the reactor or regenerator is further heated, and then contacted with feed.

Still further provided by the invention is a process of starting up a fluidized bed reactor system having a reactor in connection with a regenerator. The reactor and regenerator are heated and catalyst comprising activated metalloaluminophosphate molecular sieve is loaded into the heated regenerator. The catalyst loaded into the regenerator is further heated. Heated catalyst is then circulated between the regenerator and reactor, with the heated catalyst contacting feed in the heated reactor.

In one embodiment of the invention, the heated portion of the reaction system into which the activated metalloaluminophosphate molecular sieve is loaded is heated to a temperature of at least 150° C. prior to catalyst loading. Preferably, the heated portion of the reaction system into which the activated metalloaluminophosphate molecular sieve is loaded is heated to a temperature of at least 200° C. prior to catalyst loading, more preferably at least 300° C. Most preferably, the heated portion of the reaction system into which the activated metalloaluminophosphate molecular sieve is loaded is heated to a temperature of at least water critical temperature prior to catalyst loading.

In another embodiment of the invention, the catalyst loaded into the reaction system is maintained at a predetermined catalytic activity index while the sieve is in the reaction system. Desirably, the predetermined catalytic activity index is at least 0.7, preferably at least 0.8, and more preferably, at least 0.9.

In yet another embodiment, the metalloaluminophosphate molecular sieve is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AlPO-5, AlPO-11, AlPO-18, AlPO-31, AlPO-34, AlPO-36, AlPO-37, AlPO-46, metal containing molecular sieves thereof, and mixtures thereof.

According to the invention, the feed to the system is selected from the group consisting of kerosenes, naphthas, diesels, light or heavy gas oils, vacuum distillates or residua, light cycle oils, heavy cycle oils, benzenes, xylenes, toluenes, naphthalenes, and alcohols.

In another embodiment, the catalyst loaded into the reaction system is heated to a temperature that is at least 100° C. higher than when first loaded into the reaction system. Preferably, the catalyst loaded into the reaction system is heated to a temperature of at least 400° C. In one aspect, the catalyst loaded into the reaction system can be heated by combusting hydrocarbon oil in the reaction system.

The reaction system of the invention is widely applicable to many types of processes. Examples of reaction systems are selected from the group consisting of catalytic cracking reaction systems, transalkylation reaction systems, isomerization reaction systems, catalytic dewaxing systems, alkylation reaction systems, hydrocracking reaction systems, systems for converting paraffins to olefins, systems for converting paraffins to aromatics, systems for converting olefins to gasoline, systems for converting olefins to distillate, systems for converting olefins to lubes, systems for converting alcohols to olefins, disproportionation reaction systems, systems for converting aromatics to higher aromatics, systems for adsorbing aromatics, systems for converting oxygenates to olefins, systems for converting oxygenates to aromatics, systems for oligomerizing olefins, and systems for converting unsaturated hydrocarbons to aldehydes.

In one embodiment of the invention, the activated metalloaluminophosphate molecular sieve is a silicoaluminophosphate having a Si/Al ratio of not greater than 0.5. In a preferred embodiment, the activated metalloaluminophosphate molecular sieve is a silicoaluminophosphate having a Si/Al ratio of not greater than 0.3, particularly not greater than 0.2, more preferably not greater than 0.15, and most preferably not greater than 0.1.

BRIEF DESCRIPTION OF THE DRAWINGS

Examples of various embodiments of this invention are shown in the attached Figures, wherein.

DETAILED DESCRIPTION OF THE INVENTION

Figure 1:
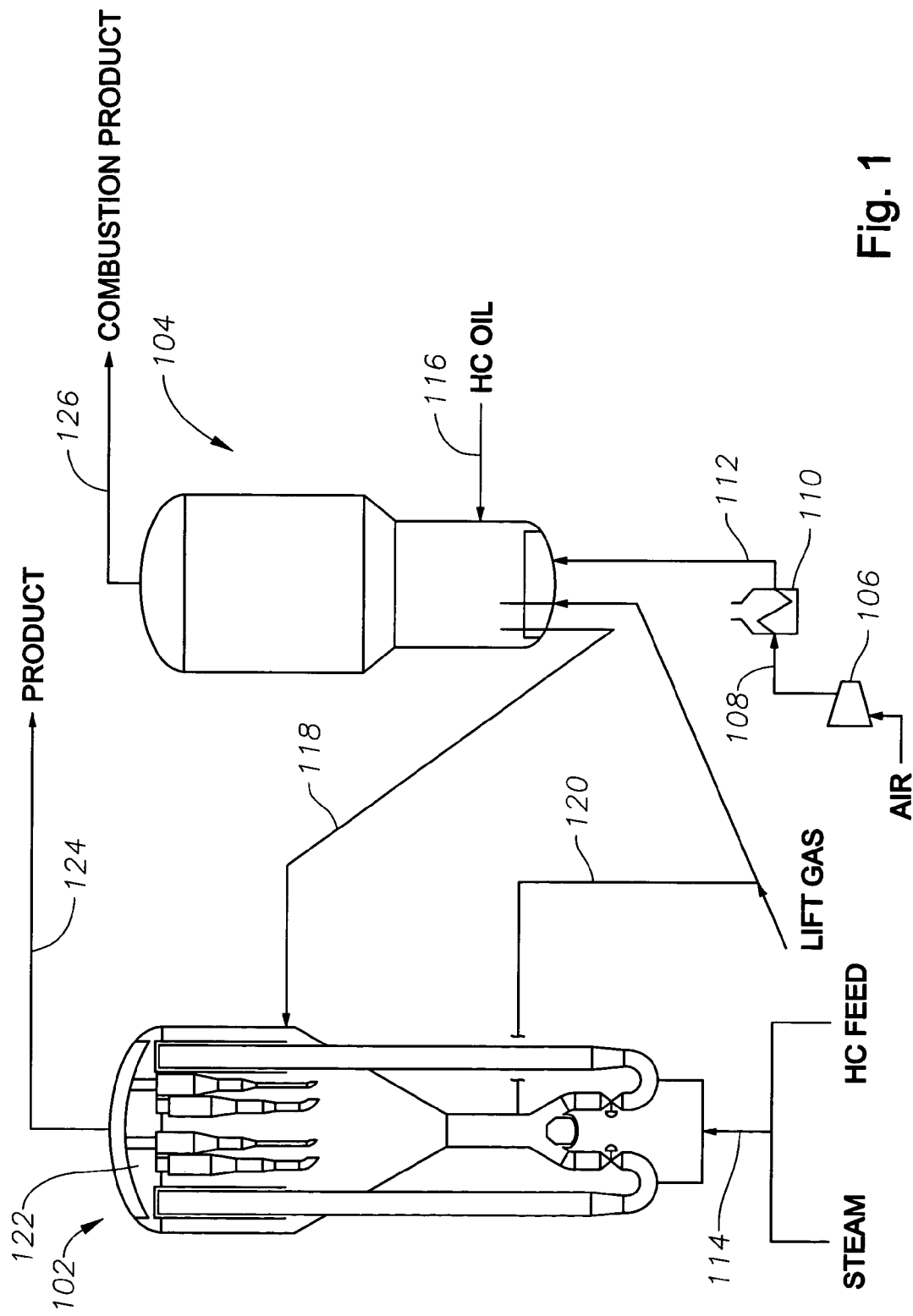
FIG. 1 is flow diagram of a reaction system comprising a reactor unit and a regenerator, the regenerator being heated by air, and the reactor being heated by steam during start up.

I. Start Up Methods to Protect Against Loss of Catalytic Activity

This invention is directed to methods of starting up reaction systems that use catalysts that comprise molecular sieves, particularly metalloaluminophosphate molecular sieves, which are susceptible to loss of catalytic activity due to contact with water molecules. Since many metalloaluminophosphate molecular sieves, particularly silicoaluminophosphate molecular sieves, are susceptible to loss of catalytic activity upon activation and contact with water molecules, start up methods are particularly important. If activated catalyst is left exposed to water vapor for even short periods of time, significant loss of catalytic activity can occur.

According to this invention, activated catalyst is loaded into a reaction system and maintained at conditions so as to minimize or avoid loss of catalytic activity, until feed is fully introduced into the reaction system. In one embodiment, the reaction system is sufficiently heated prior to introduction of the activated catalyst into the system. Alternatively, conditions of temperature of the catalyst, water partial pressure of the reaction system, and time of contact with water molecules are controlled so that loss of catalytic activity is not significant. These conditions are controlled so that the activated catalyst adsorbs little if any water. The greater the amount of water adsorbed, the greater the rate of deactivation of the catalyst.

Once catalyst has been loaded into the reaction system and heated to a temperature effective to start the reaction process, feed is introduced into the reaction system and contacted with the catalyst. Once the system is at reaction conditions, the temperature will be sufficiently high so that deactivation by contact with water molecules will not be problematic.

Deactivation of the molecular sieve is determined in this invention by a catalytic activity index (CAI). The CAI provides a measure of catalyst deactivation as a result of catalyst exposure temperature, relative water pressure, and water contact time working in concert to deactivate the catalyst. Thus, for example, although a low relative water pressure generally causes less catalyst deactivation, higher relative water pressures may be mitigated by limiting the contact time or controlling the catalyst exposure temperature. The CAI formula of this invention fully describes allowable combinations of time, temperature and relative water pressure to limit catalyst deactivation to specified values.

The catalytic activity index of this invention is defined as the actual catalytic activity at time of measurement divided by the maximum catalytic activity (before any deactivation occurs). In this regard, the CAI would be 0 for a completely deactivated catalyst, and 1 for a catalyst having maximum catalytic activity.

The catalytic activity index (CAI) is calculated according to the following equation.

$$CAI = \exp(f(T) * f(PP_{water})^n * alpha * t)$$

wherein
t = time of contact of catalyst with water (hours)
T = temperature at contact (° C.)
$PP_{water}$ = Partial Pressure of water in contact gas (psia)
alpha = -0.071
n = 3.5
$f(T) = \exp(ea(1/(T+273) - 1/(T_o+273)))$
ea = -5500° K.
$T_o$ = 200° C.
$f(PP_{water}) = (26.2 * PP_{water}/P_{sat} + 1.14) * 0.175$, for T ≧ 180° C. (453° K.)
$f(PP_{water}) = ((26.2 + 0.272 * (180-T)) * PP_{water}/P_{sat} + 1.14) * 0.175$, for 180° C. (453° K.) > T ≧ 150° C. (433° K.)
$P_{sat}$ = Saturation pressure of water at T (psia).

In one embodiment of the invention, the reaction system is started up by loading activated catalyst into the reaction system so that the activated molecular sieve portion of the catalyst does not contact or adsorb any significant amount of water molecules. Then, the activated catalyst is heated and feed introduced into the reactor system. The activated catalyst is heated to a temperature effective to convert the feed to product upon contact of the feed with the activated catalyst.

Preferably, the activated catalyst is loaded and maintained in the reaction system at a temperature greater than or equal to water critical temperature (i.e., 374° C.). At water critical temperature and above, water cannot be liquefied, so water adsorption will be minimized. There is no upper limit to the temperature, except to a practical extent of unit operations. For example, a practical temperature limit is generally one not greater than about 1,000° C., preferably not greater than about 900° C., more preferably not greater than about 800° C.

At temperatures below water critical temperature, water adsorption can occur. However, at temperatures reasonably close to water critical temperature, water adsorption is not significant. In one embodiment of the invention, the activated catalyst is loaded and maintained in the reaction system at a temperature of at least 300° C. In another embodiment, the activated catalyst is loaded and maintained in the reaction system at a temperature of at least 325° C.

The activated molecular sieve can be loaded into and maintained in the reaction system at lower temperatures. For example at temperatures in the range of from about 150° C. to about 300° C., or in the range of from about 160° C. to about 280° C., or in the range of from about 180° C. to about 260° C. However, the activated catalyst is loaded and maintained in the reaction system for a time, and under water partial pressure conditions that do not significantly deactivate the catalyst. Preferably, the activated catalyst is loaded into the reaction system and maintained in the reaction system at conditions effective to maintain a catalytic activity index (CAI) at a predetermined level where the catalyst is catalytically effective to convert feed to desired end product. Preferably the activated catalyst is loaded into the reaction system and maintained in the reaction system at conditions effective to maintain a catalytic activity index of at least 0.7. More preferably, the activated molecular sieve is loaded into the reaction system and maintained in the reaction system at conditions effective to maintain a catalytic activity index of at least 0.8, and most preferably a catalytic activity index of at least 0.9.

Adsorption of water by activated molecular sieve can occur in situations where the catalyst is contained in the reaction system at a temperature lower than water critical temperature and the system contains at least a measurable amount of water, i.e., a condition in which the reaction system is not considered completely dry. The amount of water in the gas can be effectively determined according to the relative water pressure of the gas in the reaction system. Relative water pressure ($P_r$) in this invention is defined as actual partial pressure of the water ($PP_{water}$) divided by saturated water pressure ($P_{sat}$) at a given temperature below the critical temperature of water. The relative water pressure is a measure of the wetness of the environment in which the activated molecular sieve is contacted with the gas. For example, a $P_r$=1 means 100% water saturation, and a $P_r$=0 means that the gas or environment is completely dry.

In this invention relative water pressure of the reaction system into which the activated catalyst is loaded can range from very low, i.e., low humidity conditions, to a value of 1, saturated water conditions. For example, at 205° C., if the activated catalyst is contacted with room air (at 23° C. and at 71% relative humidity), this air contains water at a partial pressure of 0.29 psia (71/100*0.41=0.29, where 0.41 psia is the saturation water pressure at 23° C.). When this air is heated up to 205° C., the relative water pressure becomes 0.29/250=0.00116, where 250 psia is the saturation water pressure at 205° C. The relative humidity of the gas at 205° C. is 0.00116*100=0.116%. This example illustrates that one can use high humidity room air as a heating medium at elevated temperature to provide an environment having a low relative water pressure.

In general, the higher the water pressure, the greater the tendency of the activated catalyst to adsorb water, given constant catalyst exposure temperature and time of gas contact. The greater the amount of water adsorbed, the higher the rate of catalyst deactivation. Nevertheless, by increasing temperature or lowering time of contact, increased water pressure can be tolerated. This is particularly beneficial, since it would be extremely difficult to start up a reaction system, keeping the system completely dry. Thus, in one embodiment of the invention, the reaction system into which the activated sieve is loaded (i.e., the gas environment of the sieve) has a relative water pressure of at least 0.0001. In another embodiment, the reaction system has a relative water pressure of at least 0.001; in another, a relative water pressure of at least 0.01, and in yet another a relative water pressure of at least 0.1.

In another embodiment of the invention, the water partial pressure of the reaction system, particularly the portion of the reaction system into which the activated catalyst is loaded, is controlled so that activated molecular sieve adsorbs little to no water. Preferably, the water partial pressure of the reaction system, particularly the portion of the reaction system into which the activated catalyst is loaded, is controlled so that activated molecular sieve has a water content of not greater than about 1.25 wt %, based on dry weight of the activated molecular sieve. More preferably, the activated molecular sieve has a water content of not greater than about 1.0 wt %, still more preferably not greater than about 0.8 wt %, and most preferably not greater than about 0.5 wt %, based on total weight of the activated molecular sieve.

II. Type of Reaction Systems Encompassed by the Invention

The start up methods of this invention are useful in any reaction system that involves the use of catalyst that comprises molecular sieve susceptible to loss of catalytic activity due to contact with water molecules. Non-limiting examples of such reaction systems include reaction systems selected from the group consisting of catalytic cracking reaction systems, transalkylation reaction systems, isomerization reaction systems, catalytic dewaxing systems, alkylation reaction systems, hydrocracking reaction systems, systems for converting paraffins to olefins, systems for converting paraffins to aromatics, systems for converting olefins to gasoline, systems for converting olefins to distillate, systems for converting olefins to lubes, systems for converting alcohols to olefins, disproportionation reaction systems, systems for converting aromatics to higher aromatics, systems for adsorbing aromatics, systems for converting oxygenates (e.g., alcohols) to olefins, systems for converting oxygenates (e.g., alcohols) to aromatics, systems for oligomerizing olefins, and systems for converting unsaturated hydrocarbons to aldehydes. More specifically, such examples include:

A) The catalytic cracking of a naphtha feed to produce light olefins. Typical reaction conditions include from about 500° C. to about 750° C., pressures of subatmospheric or atmospheric, generally ranging up to about 10 atmospheres (gauge) and residence time (time of contact of feed and/or product with catalyst) from about 10 milliseconds to about 10 seconds;

B) The catalytic cracking of high molecular weight hydrocarbons to lower weight hydrocarbons. Typical reaction conditions for catalytic cracking include temperatures of from about 400° C. to about 700° C., pressures of from about 0.1 atmosphere (bar) to about 30 atmospheres, and weight hourly space velocities of from about 0.1 $hr^{-1}$ to about 100 $hr^{-1}$;

C) The transalkylation of aromatic hydrocarbons in the presence of polyalkylaromatic hydrocarbons. Typical reaction conditions include a temperature of from about 200° C. to about 500° C., a pressure of from about atmospheric to about 200 atmospheres, a weight hourly space velocity of from about 1 $hr^{-1}$ to about 100 $hr^{-1}$, and an aromatic hydrocarbon/polyalkylaromatic hydrocarbon mole ratio of from about 1/1 to about 16/1;

D) The isomerization of aromatic (e.g., xylene) feedstock components. Typical reaction conditions for such include a temperature of from about 230° C. to about 510° C., a pressure of from about 0.5 atmospheres to about 50 atmospheres, a weight hourly space velocity of from about 0.1 $hr^{-1}$ to about 200 $hr^{-1}$, and a hydrogen/hydrocarbon mole ratio of from about 0 to about 100/1;

E) The catalytic dewaxing of hydrocarbons by selectively removing straight chain paraffins. The reaction conditions are dependent in large measure on the feed used and upon the desired pour point. Typical reaction conditions include a temperature between about 200° C. and 450° C., a pressure of up to 3,000 psig and a liquid hourly space velocity from 0.1 $hr^{-1}$ to 20 $hr^{-1}$.

F) The alkylation of aromatic hydrocarbons, e.g., benzene and alkylbenzenes, in the presence of an alkylating agent, e.g., olefins, formaldehyde, alkyl halides and alcohols having 1 to about 20 carbon atoms. Typical reaction conditions include a temperature of from about 100° C. to about 500° C., a pressure of from about atmospheric to about 200 atmospheres, a weight hourly space velocity of from about 1 $hr^{-1}$ to about 100 $hr^{-1}$, and an aromatic hydrocarbon/alkylating agent mole ratio of from about 1/1 to about 20/1;

G) The alkylation of aromatic hydrocarbons, e.g., benzene, with long chain olefins, e.g., $C_{14}$ olefin. Typical reaction conditions include a temperature of from about 50° C. to about 200° C., a pressure of from about atmospheric to about 200 atmospheres, a weight hourly space velocity of from about 2 $hr^{-1}$ to about 2000 $hr^{-1}$, and an aromatic hydrocarbon/olefin mole ratio of from about 1/1 to about 20/1. The resulting products from the reaction are long chain alkyl aromatics, which when subsequently sulfonated have particular application as synthetic detergents;

H) The alkylation of aromatic hydrocarbons with light olefins to provide short chain alkyl aromatic compounds, e.g., the alkylation of benzene with propylene to provide cumene. Typical reaction conditions include a temperature of from about 10° C. to about 200° C., a pressure of from about 1 to about 30 atmospheres, and an aromatic hydrocarbon weight hourly space velocity (WHSV) of from 1 $hr^{-1}$ to about 50 $hr^{-1}$;

I) The hydrocracking of heavy petroleum feedstocks, cyclic stocks, and other hydrocrack charge stocks. The catalyst will contain an effective amount of at least one hydrogenation component;

J) The alkylation of a reformate containing substantial quantities of benzene and toluene with fuel gas containing short chain olefins (e.g., ethylene and propylene) to produce mono- and dialkylates. Preferred reaction conditions include temperatures from about 100° C. to about 250° C., a pressure of from about 100 psig to about 800 psig, a WHSV-olefin from about 0.4 $hr^{-1}$ to about 0.8 $hr^{-1}$, a WHSV-reformate of from about 1 $hr^{-1}$ to about 2 $hr^{-1}$ and, optionally, a gas recycle from about 1.5 to about 2.5 vol/vol fuel gas feed;

K) The alkylation of aromatic hydrocarbons, e.g., benzene, toluene, xylene, and naphthalene, with long chain olefins, e.g., $C_{14}$ olefin, to produce alkylated aromatic lube base stocks. Typical reaction conditions include temperatures from about 100° C. to about 400° C. and pressures from about 50 psig to 450 psig;

L) The alkylation of phenols with olefins or equivalent alcohols to provide long chain alkyl phenols. Typical reaction conditions include temperatures from about 100° C. to about 250° C., pressures from about 1 to 300 psig and total WHSV of from about 2 $hr^{-1}$ to about 10 $hr^{-1}$;

M) The conversion of light paraffins to olefins and/or aromatics. Typical reaction conditions include temperatures from about 425° C. to about 760° C. and pressures from about 10 psig to about 2000 psig;

N) The conversion of light olefins to gasoline, distillate and lube range hydrocarbons. Typical reaction conditions include temperatures of from about 175° C. to about 375° C., and a pressure of from about 100 psig to about 2000 psig;

O) Two-stage hydrocracking for upgrading hydrocarbon streams having initial boiling points above about 200° C. to premium distillate and gasoline boiling range products or as feed to further fuels or chemicals processing steps. Either stage of the two-stage system can contain catalyst, which contains molecular sieve that is susceptible to loss of catalytic activity due to contact with water molecules. Typical reaction conditions include temperatures of from about 315° C. to about 455° C., pressures of from about 400 to about 2500 psig, hydrogen circulation of from about 1000 SCF/bbl to about 10,000 SCF/bbl and a liquid hourly space velocity (LHSV) of from about 0.1 hr$^{-1}$ to 10 hr$^{-1}$;

P) A combination hydrocracking/dewaxing process in the presence of a catalyst that contains molecular sieve that is susceptible to loss of catalytic activity due to contact with water molecules. The catalyst generally further comprises a hydrogenation component. Optionally included in the catalyst is zeolite molecular sieve such as zeolite Beta. Typical reaction conditions include temperatures from about 350° C. to about 400° C., pressures from about 1400 psig to about 1500 psig, LHSVs from about 0.4 hr$^{-1}$ to about 0.6 hr$^{-1}$ and a hydrogen circulation from about 3000 to about 5000 SCF/bbl;

Q) The reaction of alcohols with olefins to provide mixed ethers, e.g., the reaction of methanol with isobutene and/or isopentene to provide methyl-t-butyl ether (MTBE) and/or t-amyl methyl ether (TAME). Typical conversion conditions include temperatures from about 20° C. to about 200° C., pressures from 2 to about 200 atm, WHSV (gram-olefin per hour gram-zeolite) from about 0.1 hr$^{-1}$ to about 200 hr$^{-1}$ and an alcohol to olefin molar feed ratio from about 0.1/1 to about 5/1;

R) The disproportionation of aromatics, e.g., the disproportionation toluene to make benzene and paraxylene. Typical reaction conditions include a temperature of from about 200° C. to about 760° C., a pressure of from about atmospheric to about 60 atmosphere (bar), and a WHSV of from about 0.1 hr$^{-1}$ to about 30 hr$^{-1}$;

S) The conversion of naphtha (e.g., $C_6$-$C_{10}$) and similar mixtures to highly aromatic mixtures. Thus, normal and slightly branched chained hydrocarbons, preferably having a boiling range above about 40° C., and less than about 200° C., can be converted to products having a substantially higher octane aromatics content by contacting the hydrocarbon feed with a molecular sieve catalyst at a temperature of from about 400° C. to 600° C., preferably from about 480° C. to about 550° C., at pressures of from atmospheric to 40 bar, and liquid hourly space velocities (LHSV) of from 0.1 hr$^{-1}$ to 15 hr$^{-1}$;

T) The adsorption of alkyl aromatic compounds for the purpose of separating various isomers of the compounds;

U) The conversion of oxygenates, e.g., alcohols, such as methanol, or ethers, such as dimethylether, or mixtures thereof to hydrocarbons including olefins and aromatics with reaction conditions including temperatures of from about 275° C. to about 600° C., pressures of from about 0.5 atmosphere to about 50 atmospheres, and a liquid hourly space velocity of from about 0.1 hr$^{-1}$ to about 100 hr$^{-1}$;

V) The oligomerization of straight and branched chain olefins having from about 2 to about 5 carbon atoms. The oligomers which are the products of the process are medium to heavy olefins which are useful for both fuels, i.e., gasoline or a gasoline blending stock, and chemicals. The oligomerization process is generally carried out by contacting the olefin feedstock in a gaseous state phase with a molecular sieve catalyst at a temperature in the range of from about 250° C. to about 800° C., a LHSV of from about 0.2 hr$^{-1}$ to about 50 hr$^{-1}$, and a hydrocarbon partial pressure of from about 0.1 to about 50 atmospheres. Temperatures below about 250° C. may be used to oligomerize the feedstock when the feedstock is in the liquid phase when contacting the coated zeolite catalyst. Thus, when the olefin feedstock contacts the catalyst in the liquid phase, temperatures of from about 10° C. to about 25° C. may be used;

W) The conversion of $C_2$ unsaturated hydrocarbons (ethylene and/or acetylene) to aliphatic $C_{6-12}$ aldehydes and converting said aldehydes to the corresponding $C_{6-12}$ alcohols, acids, or esters.

In general, the, catalytic conversion conditions over the molecular sieve catalyst include a temperature of from about 100° C. to about 760° C., a pressure of from about 0.1 atmosphere (bar) to about 200 atmospheres (bar), a weight hourly space velocity of from about 0.08 hr$^{-1}$ to about 2,000 hr$^{-1}$.

The start up methods of this invention are particularly suited to large, commercial scale reaction systems. For example, the start up methods of this invention are particularly suited to reaction systems that require a catalyst loading of at least about 1,000 kg of catalyst, based on total amount of catalyst located throughout the reaction system. In particular, the start up methods of this invention are particularly suited to reaction systems that require a catalyst loading of at least about 10,000 kg of catalyst, more particularly a catalyst loading of at least about 100,000 kg of catalyst, and most particularly a catalyst loading of at least about 250,000 kg of catalyst, based on total amount of catalyst located throughout the reaction system.

The catalyst loaded into the reaction system need not be fully comprised of a molecular sieve that is susceptible to loss of catalytic activity due to contact with water molecules. The catalyst need contain only an amount of such molecular sieve that materially affects the desired product slate. For example, in one embodiment, the catalyst loaded into the system comprises at least about 1 wt % of a molecular sieve that is susceptible to loss of catalytic activity due to contact with water molecules, based on total weight of catalyst loaded into the system. In anther embodiment, the catalyst loaded into the system comprises at least about 5 wt % of a molecular sieve that is susceptible to loss of catalytic activity due to contact with water molecules, based on total weight of catalyst loaded into the system; in another embodiment at least about 10 wt %, based on total weight of catalyst loaded into the system.

In terms of feed to the system, the start up methods of this invention are particularly suited to reaction systems that are rated at a total liquid throughput of at least about 500 barrels per day. More particularly, the start up methods of this invention are suited to reaction systems that are rated at a total liquid throughput of at least about 1,000 barrels per day, still more particularly at least about 5,000 barrels per day, and most particularly at least about 10,000 barrels per day.

The liquid feed that is to the reaction system to start up the system is any conventional hydrocarbon feed that is appropriate to the unit being started up. Non-limiting examples of such feed includes hydrocarbon oils such as kerosenes, naphthas, diesels, light or heavy gas oils, vacuum distillates or residua, light cycle oils, heavy cycle oils; aromatics such as benzenes, xylenes, toluenes, naphthalenes; and alcohols, including monoalcohols or polyols, particularly $C_1$-$C_{10}$ monoalcohols (especially methanol, ethanol and propanol) and $C_3$-$C_{10}$ polyols.

The catalyst loaded into the system can be of any conventional shape or size, including, but not limited to, those catalyst types made by spray drying, pelletizing, extrusion, and any of various conventional sphere-making techniques. The molecular sieve contained in the catalyst can be incorporated into each catalyst particle or catalyst particles containing the molecular sieve can be admixed with other catalyst particles that do not contain molecular sieve.

The reaction systems into which the catalyst is loaded contain a reactor unit. Optionally, the reaction systems contain two or more reactor units. The reactor units can be in series or parallel. Non-limiting examples of reaction systems which can be started up according to this invention include dense bed reaction systems, fixed bed reaction systems, fluidized bed reaction systems, fast fluidized bed reaction systems, circulating fluidized bed reaction systems, riser reactor systems, and the like. Suitable conventional reaction systems and reactor types are described in for example U.S. Pat. Nos. 4,076,796, 6,287,522 (dual riser), and *Fluidization Engineering*, D. Kunii and O. Levenspiel, Robert E. Krieger Publishing Company, New York, N.Y. 1977, which are all herein fully incorporated by reference. Other examples of reaction systems include riser reactors, such as those generally described in *Riser Reactor, Fluidization and Fluid-Particle Systems*, pages 48 to 59, F. A. Zenz and D. F. Othmo, Reinhold Publishing Corporation, New York, 1960, and U.S. Pat. No. 6,166,282 (fast-fluidized bed reactor), and U.S. patent application Ser. No. 09/564, 613 filed May 4, 2000 (multiple riser reactor), which references are all herein fully incorporated by reference.

In a preferred embodiment, a fluidized bed process or fast fluidized bed process includes a reactor system, a regeneration system and a recovery system. The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock is fed to the one or more riser reactor(s) in which an activated molecular sieve catalyst composition is introduced.

In another embodiment, the reaction systems, which are started up according to this invention, further include a regenerator unit. Optionally, the reaction systems include two or more regenerator units. The regenerator units are in connection with at least one of the reactor units, preferably in a manner that allows catalyst to be circulated or flowed between the reactor and regenerator.

III. Loading Catalyst and Heating up the Reaction System

In one embodiment of the invention, at least a portion of the reaction system is heated prior to loading of the catalyst. In a particular embodiment, at least the portion of the reaction system that is heated prior to catalyst loading is heated to at least about 150° C. prior to catalyst loading. In another embodiment, at least the portion of the reaction system that is heated prior to catalyst loading is heated to at least about 200° C. prior to catalyst loading. Preferably, at least the portion of the reaction system that is heated prior to catalyst loading is heated to at least about 300° C., most preferably to a temperature at least that of water critical temperature, prior to catalyst loading.

The portion of the reaction system that is heated is optionally held at a temperature effective to heat and/or dry refractory material that is present in the reaction system. For example, the reaction system can are typically held at a temperature of from about 200° C. to about 450° C., but preferably without catalyst present when the holding temperature is below water critical temperature (374° C.). Such refractory material can be any conventional material used in reaction systems. Preferably, the refractory materials are sufficiently dried prior to introduction of catalyst, since water molecules will tend to be released from the refractory material during the drying process. In one embodiment, at least a portion of the reaction system is heated for about 2 hours to about 48 hours prior to catalyst loading. Preferably, at least a portion of the reaction system is heated for about 4 hours to about 24 hours, more preferably from about 6 hours to about 12 hours prior to catalyst loading.

The reaction system can be a hot wall or cold wall reactor system. In one embodiment, the reaction system is a hot wall reactor system. Hot wall systems use refractory materials that are thinner than that of cold wall systems, and, therefore, would release less water during dry out. In another embodiment, the reaction system is a cold wall reaction system. The cold wall reaction systems use thicker refractory materials, but the thicker refractory allows the reactor itself to be thinner, since the cold wall material can handle a greater heat load during unit operation.

The catalyst that is loaded into the reaction system is to be maintained so that any loss of catalytic activity is not significant, preferably limiting catalyst loss to a predetermined catalytic activity index. In one embodiment, the catalyst is maintained in the reaction system at a catalytic activity index of at least about 0.7, preferably at least about 0.8, and more preferably at least about 0.9.

In a particular embodiment, the catalyst is loaded into the reactor unit of the reaction system. Optionally, the reaction system contains a reactor unit and a regenerator unit, and the catalyst is loaded into the regenerator unit.

The activated catalyst is loaded into the reactor or regenerator unit in any conventional manner. For example, the catalyst is loaded directly into the reactor or regenerator unit through openings on the units or vessels. In one embodiment, the catalyst is loaded into the reactor or regenerator through an upper portion of the vessels. In another embodiment, the catalyst is loaded into the reactor or regenerator through a bottom portion of the units or vessels. Loading can be accomplished with the aid of hoppers and conduits positioned to feed the catalyst into the particular unit.

In an alternative embodiment of the invention, the catalyst loaded into the reaction system is further heated, preferably after a predetermined level of catalyst has been added. The additional heating provides further protection against deactivation of the activated molecular sieve that is susceptible to deactivation due to contact with water molecules. Preferably, the loaded catalyst is heated to a temperature that is at least about 100° C. higher than when first loaded into the reaction system, more preferably at least about 150° C., and most preferably at least about 200° C.

In another embodiment, the catalyst loaded into the reaction system is further heated to a temperature of at least about 300° C. Preferably, the catalyst loaded into the reaction system is further heated to a temperature of at least about 400° C., more preferably a temperature of at least about 450° C., and most preferably to a temperature of at least about 500° C.

In general, at relatively low temperatures, the catalyst is to be maintained in the reaction system for only a limited time. Otherwise, the catalytic activity of the molecular sieve may become significantly deactivated. Desirably, at temperatures not greater than about 300° C., more particularly not greater than about water critical temperature, the catalyst is maintained in the reaction system for a time to maintain the catalytic activity index at or above the desired level. In general, the catalyst containing the activated molecular sieve is maintained in the reaction system (e.g., the reaction unit or regenerator unit) at such temperatures for not greater than about 500 hours. Preferably, the catalyst containing the activated molecular sieve is maintained at such temperatures in the reaction system for not greater than about 250 hours, more preferably not greater than about 100 hours. In other embodiments, the catalyst containing the activated molecular sieve is maintained in the reaction system at such temperatures from about 0.01 hour to about 50 hours, or from about 0.1 hour to about 50 hours, and more preferably not greater than about 24 hours or about 12 hours or about 6 hours. As the system is heated to higher temperatures, the catalyst can be maintained in the system indefinitely without significant reduction in catalytic activity as a result of contact with water molecules.

The reaction system can be heated using any conventional gas as a heating medium. Non-limiting examples of such gas include air, nitrogen, helium, flue gas, $CO_2$, fuel gas, and any combination thereof. Air is most preferred, as air is generally used in various unit start up operations.

The gas that is used as the heating medium is preferably dry. However, the gas does not have to be completely dry as such a condition is not generally practical at commercial scale. In one embodiment of the invention, the gas contacting the sieve (i.e., the gas environment of the sieve) has a relative water pressure of at least 0.0001. In another embodiment, the gas containing water has a relative water pressure of at least 0.001; in another, a relative water pressure of at least 0.01, and in yet another a relative water pressure of at least 0.1.

In certain embodiments, air containing water (i.e., steam) can be used at either saturated conditions or at superheated steam conditions. For example, air containing a higher proportion of water can be used to initially heat at least a portion of the reaction system, prior to loading the catalyst. Such an initial heating of the reaction system can more quickly heat the system, since the water has a greater ability to transfer heat than air or other gas.

To further heat the catalyst or reaction system a combustion or hydrocarbon fuel can be used. The combustion of a fuel to provide additional heat can be beneficial in circumstances where gas (e.g., air, nitrogen, helium, flue gas, $CO_2$, fuel gas, and any combination thereof) or gas including water vapor (i.e., steam) does not have sufficient heat to bring the catalyst to start up temperatures. Once an effective start up temperature is achieved, feed is introduced into the reaction system, and the feed contacts the heated catalyst to begin the reaction process.

In a particular embodiment, a hydrocarbon oil, such as for example kerosene, naphtha, light cycle oil, light virgin diesel, torch oil, or the like, is used as a fuel to further heat the loaded catalyst. Such fuels can be injected through nozzles into a loaded bed of catalyst and combusted. Preferably, the hydrocarbon oil is injected into the reaction system after the reaction system has been initially heated to a temperature that is at least as high as the auto-ignition temperature of the hydrocarbon oil to further increase the temperature of the reaction system, preferably to at least operating temperature of the particular reaction system. In one embodiment, the hydrocarbon oil is injected into the system after the system has reached a temperature of at least about 350° C., preferably at least about 375° C., and more preferably at least about 400° C. Upon combustion of the hydrocarbon oil, the temperature of the reaction system is further increased, preferably to at least the operating temperature of the reaction process.

In one embodiment, the reaction system includes at least two reaction units or one or more reaction units and one or more regenerator units, and the heated catalyst is circulated between units to aid in heating the reaction system. Preferably, the reaction system contains a reactor unit and a regenerator unit, and the heated catalyst is circulated between the units to further heat the system. In one embodiment, the heated catalyst is circulated to the regenerator unit using a lift gas such as air, nitrogen, helium, flue gas, $CO_2$, fuel gas, and any combination thereof. In another embodiment, the heated catalyst is circulated at a temperature that is at least as high as operating temperature. In another embodiment, a gas or gas including water vapor is used to heat the catalyst, particularly in the reactor unit, and a hydrocarbon oil is injected into the regenerator unit to further heat the catalyst, while circulating, as described above. Once the reaction system or catalyst is sufficiently heated to operating temperature, feed is introduced into the reactor unit, and the reaction process is started.

IV. Types of Molecular Sieves

The catalyst that is used in the methods of this invention contains molecular sieve material that is susceptible to deactivation due to contact with water molecules. The molecular sieves that are included in the catalyst or catalyst mixtures are preferably metalloaluminophosphate molecular sieves that have a molecular framework that include [AlO4] and [PO4] tetrahedral units, such as metal containing aluminophosphates (AlPO). In one embodiment, the metalloaluminophosphate molecular sieves include [Al04], [PO4] and [SiO4] tetrahedral units, such as silicoaluminophosphates (SAPO).

Various silicon, aluminum, and phosphorus based molecular sieves and metal-containing derivatives thereof have been described in detail in numerous publications including for example, U.S. Pat. No. 4,567,029 (MeAPO where Me is Mg, Mn, Zn, or Co), U.S. Pat. No. 4,440,871 (SAPO), European Patent Application EP-A-0 159 624 (ELAPSO where El is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683,217, 4,744,885 (FeAPSO), EP-A-0 158 975 and U.S. Pat. No. 4,935,216 (ZnAPSO, EP-A-0 161 489 (CoAPSO), EP-A-0 158 976 (ELAPO, where EL is Co, Fe, Mg, Mn, Ti or Zn), U.S. Pat. No. 4,310,440 (AlPO4), EP-A-0 158 350 (SENAPSO), U.S. Pat. No. 4,973,460 (LiAPSO), U.S. Pat. No. 4,789,535 (LiAPO), U.S. Pat. No. 4,992,250 (GeAPSO), U.S. Pat. No. 4,888,167 (GeAPO), U.S. Pat. No. 5,057,295 (BAPSO), U.S. Pat. No. 4,738,837 (CrAPSO), U.S. Pat. Nos. 4,759,919, and 4,851,106 (CrAPO), U.S. Pat. Nos. 4,758,419, 4,882,038, 5,434,326 and 5,478,787 (MgAPSO), U.S. Pat. No. 4,554,143 (FeAPO), U.S. Pat. No. 4,894,213 (AsAPSO), U.S. Pat. No. 4,913,888 (AsAPO), U.S. Pat. Nos. 4,686,092, 4,846,956 and 4,793,833 (MnAPSO), U.S. Pat. Nos. 5,345,011 and 6,156,931 (MnAPO), U.S. Pat. No. 4,737,353 (BeAPSO), U.S. Pat. No. 4,940,570 (BeAPO), U.S. Pat. Nos. 4,801,309, 4,684,617 and 4,880,520 (TiAPSO), U.S. Pat. Nos. 4,500, 651, 4,551,236 and 4,605,492 (TiAPO), U.S. Pat. Nos. 4,824,554, 4,744,970 (CoAPSO), U.S. Pat. No. 4,735,806 (GaAPSO) EP-A-0 293 937 (QAPSO, where Q is framework oxide unit [QO2]), as well as U.S. Pat. Nos. 4,567,029, 4,686,093, 4,781,814, 4,793,984, 4,801,364, 4,853,197, 4,917,876, 4,952,384, 4,956,164, 4,956,165, 4,973,785, 5,241,093, 5,493,066 and 5,675,050, all of which are herein fully incorporated by reference. Other molecular sieves include those described in R. Szostak, Handbook of Molecular Sieves, Van Nostrand Reinhold, New York, N.Y. (1992), which is herein fully incorporated by reference.

The more preferred molecular sieves are SAPO molecular sieves, and metal-substituted SAPO molecular sieves. Suitable metal substituents are alkali metals of Group IA of the Periodic Table of Elements, an alkaline earth metals of Group IIA of the Periodic Table of Elements, a rare earth metals of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, transition metals of Groups IVB, VB, VIB, VIIB, VIIIB, and IB of the Periodic Table of Elements and mixtures of any of these metal species. In one embodiment, the metal is selected from the group consisting of Co, Cr, Cu, Fe, Ga, Ge, Mg, Mn, Ni, Sn, Ti, Zn and Zr, and mixtures thereof. The metal atoms may be inserted into the framework of a molecular sieve through a tetrahedral unit, such as [MeO2], and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the metalloaluminophosphate molecular sieve is represented, on an anhydrous basis, by the formula:

$$mR:(M_xAl_yP_z)O_2$$

wherein R represents at least one templating agent, preferably an organic templating agent; m is the number of moles of R per mole of $(M_xAl_yP_z)O_2$ and m has a value from 0 to 1, preferably 0 to 0.5, and most preferably from 0 to 0.3; x, y, and z represent the mole fraction of Al, P and M as tetrahedral oxides, where M is a metal selected from the group consisting of Group IA, IIA, IB, IIIB, IVB, VB, VIIB, VIIB, VIIIB and Lanthanide's of the Periodic Table of Elements. Preferably M is one or more metals selected from the group consisting of Si, Co, Cr, Cu, Fe, Ga, Ge, Mg, Mn, Ni, Sn, Ti, Zn and Zr. In an embodiment, m is greater than or equal to 0.2, and x, y and z are greater than or equal to 0.01. In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

In one embodiment of the invention, the metalloaluminophosphate molecular sieves are silicoaluminophosphate molecular sieves, containing silicon and aluminum. In general, lower Si/Al ratios lead to lower deactivation rates and higher ACIs for a given set of conditions. However, higher Si/Al ratios can be used under the appropriate conditions of temperature, water partial pressure and time of contact with water. Desirably, the metalloaluminophosphate molecular sieves of this invention are silicoaluminophosphate molecular sieves that contain Si and Al, at a Si/Al ratio of not greater than about 0.5, preferably not greater than about 0.3, more preferably not greater than about 0.2, still more preferably not greater than about 0.15, and most preferably not greater than about 0.1. In another embodiment, the Si/Al ratio is sufficiently high to allow for increased catalytic activity of the molecular sieve. Preferably, the metalloaluminophosphate molecular sieves are silicoaluminophosphate molecular sieves that contain Si and Al at a ratio of at least about 0.005, more preferably at least about 0.01, and most preferably at least about 0.02.

Non-limiting examples of SAPO and AlPO molecular sieves useful herein include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AlPO-5, AlPO-11, AlPO-18, AlPO-31, AlPO-34, AlPO-36, AlPO-37, AlPO-46, and metal containing molecular sieves thereof. Of these, particularly useful molecular sieves are one or a combination of SAPO-18, SAPO-34, SAPO-35, SAPO-44, SAPO-56, AlPO-18, AlPO-34 and metal containing derivatives thereof, such as one or a combination of SAPO-18, SAPO-34, AlPO-34, AlPO-18, and metal containing derivatives thereof, and especially one or a combination of SAPO-34, AlPO-18, and metal containing derivatives thereof.

In an embodiment, the molecular sieve is an intergrowth material having two or more distinct crystalline phases within one molecular sieve composition. In particular, intergrowth molecular sieves are described in U.S. Patent Application Publication No. 2002-0165089 and International Publication No. WO 98/15496, published Apr. 16, 1998, both of which are herein fully incorporated by reference. For example, SAPO-18, AlPO-18 and RUW-18 have an AEI framework-type, and SAPO-34 has a CHA framework-type. Thus, the molecular sieve used herein may comprise at least one intergrowth phase of AEI and CHA framework-types, especially where the ratio of CHA framework-type to AEI framework-type, as determined by the DIFFaX method disclosed in U.S. Patent Application Publication No. 2002-0165089, is greater than 1:1.

Generally, molecular sieves (i.e., molecular sieve crystals) are synthesized by the hydrothermal crystallization of one or more of a source of aluminum, a source of phosphorus, a source of silicon, water and a templating agent, such as a nitrogen containing organic compound. Typically, a combination of sources of silicon and aluminum, or silicon, aluminum and phosphorus, water and one or more templating agents, is placed in a sealed pressure vessel. The vessel is optionally lined with an inert plastic such as polytetrafluoroethylene, and heated under a crystallization pressure and temperature, until a crystalline material is formed, which can then be recovered by filtration, centrifugation and/or decanting.

Non-limiting examples of silicon sources include silicates, fumed silica, for example, Aerosil-200 available from Degussa Inc., New York, N.Y., and CAB-O-SIL M-5, organosilicon compounds such as tetraalkylorthosilicates, for example, tetramethylorthosilicate (TMOS) and tetraethylorthosilicate (TEOS), colloidal silicas or aqueous suspensions thereof, for example Ludox-HS-40 sol available from E. I. du Pont de Nemours, Wilmington, Del., silicic acid or any combination thereof.

Non-limiting examples of aluminum sources include aluminum alkoxides, for example aluminum isopropoxide, aluminum phosphate, aluminum hydroxide, sodium aluminate, pseudo-boehmite, gibbsite and aluminum trichloride, or any combination thereof. A convenient source of aluminum is pseudo-boehmite, particularly when producing a silicoaluminophosphate molecular sieve.

Non-limiting examples of phosphorus sources, which may also include aluminum-containing phosphorus compositions, include phosphoric acid, organic phosphates such as triethyl phosphate, and crystalline or amorphous aluminophosphates such as $AlPO_4$, phosphorus salts, or combinations thereof. A convenient source of phosphorus is phosphoric acid, particularly when producing a silicoaluminophosphate.

In general, templating agents or templates include compounds that contain elements of Group 15 of the Periodic Table of Elements, particularly nitrogen, phosphorus, arsenic and antimony. Typical templates also contain at least one alkyl or aryl group, such as an alkyl or aryl group having from 1 to 10 carbon atoms, for example from 1 to 8 carbon atoms. Preferred templates are nitrogen-containing compounds, such as amines, quaternary ammonium compounds and combinations thereof. Suitable quaternary ammonium compounds are represented by the general formula $R_4N^+$, where each R is hydrogen or a hydrocarbyl or substituted hydrocarbyl group, preferably an alkyl group or an aryl group having from 1 to 10 carbon atoms.

Non-limiting examples of templates include tetraalkyl ammonium compounds including salts thereof, such as tetramethyl ammonium compounds, tetraethyl ammonium compounds, tetrapropyl ammonium compounds, and tetrabutylammonium compounds, cyclohexylamine, morpholine, di-n-propylamine (DPA), tripropylamine, triethylamine (TEA), triethanolamine, piperidine, cyclohexylamine, 2-methylpyridine, N,N-dimethylbenzylamine, N,N-diethylethanolamine, dicyclohexylamine, N,N-dimethylethanolamine, choline, N,N'-dimethylpiperazine, 1,4-diazabicyclo(2,2,2) octane, N',N',N,N-tetramethyl-(1,6)hexanediamine, N-methyldiethanolamine, N-methyl-ethanolamine, N-methyl piperidine, 3-methyl-piperidine, N-methylcyclohexylamine, 3-methylpyridine, 4-methyl-pyridine, quinuclidine, N,N'-dimethyl-1,4-diazabicyclo(2,2,2) octane ion; di-n-butylamine, neopentylamine, di-n-pentylamine, isopropylamine, t-butyl-amine, ethylenediamine, pyrrolidine, and 2-imidazolidone. Preferred templates are selected from the group consisting of tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine, heated degraded forms thereof, and combinations thereof.

The pH of the synthesis mixture containing at a minimum a silicon, aluminum, optionally a phosphorus composition, and a templating agent, is generally in the range of from 2 to 10, such as from 4 to 9, for example from 5 to 8.

Generally, the synthesis mixture described above is sealed in a vessel and heated, preferably under autogenous pressure, to a temperature in the range of from about 80° C. to about 250° C., such as from about 100° C. to about 250° C., for example from about 125° C. to about 225° C., such as from about 150° C. to about 180° C.

In one embodiment, the synthesis of molecular sieve crystalline particles is aided by seeds from another or the same framework type molecular sieve.

The time required to form the crystalline particles is usually dependent on the temperature and can vary from immediately up to several weeks. Typically, the crystallization time is from about 30 minutes to around 2 weeks, such as from about 45 minutes to about 240 hours, for example from about 1 hour to about 120 hours. The hydrothermal crystallization may be carried out with or without agitation or stirring.

One method for crystallization involves subjecting an aqueous reaction mixture containing an excess amount of a templating agent to crystallization under hydrothermal conditions, establishing an equilibrium between molecular sieve formation and dissolution, and then, removing some of the excess templating agent and/or organic base to inhibit dissolution of the molecular sieve. See, for example, U.S. Pat. No. 5,296,208, which is herein fully incorporated by reference.

Other methods for synthesizing molecular sieves or modifying molecular sieves are described in U.S. Pat. No. 5,879,655 (controlling the ratio of the templating agent to phosphorus), U.S. Pat. No. 6,005,155 (use of a modifier without a salt), U.S. Pat. No. 5,475,182 (acid extraction), U.S. Pat. No. 5,962,762 (treatment with transition metal), U.S. Pat. Nos. 5,925,586 and 6,153,552 (phosphorus modified), U.S. Pat. No. 5,925,800 (monolith supported), U.S. Pat. No. 5,932,512 (fluorine treated), U.S. Pat. No. 6,046,373 (electromagnetic wave treated or modified), U.S. Pat. No. 6,051,746 (polynuclear aromatic modifier), U.S. Pat. No. 6,225,254 (heating template), PCT WO 01/36329 published May 25, 2001 (surfactant synthesis), PCT WO 01/25151 published Apr. 12, 2001 (staged acid addition), PCT WO 01/60746 published Aug. 23, 2001 (silicon oil), U.S. Patent Application Publication No. 20020055433 published May 9, 2002 (cooling molecular sieve), U.S. Pat. No. 6,448,197 (metal impregnation including copper), U.S. Pat. No. 6,521,562 (conductive microfilter), and U.S. Patent Application Publication No. 20020115897 published Aug. 22, 2002 (freeze drying the molecular sieve), which are all herein fully incorporated by reference.

Once the crystalline molecular sieve product is formed, usually in a slurry state, it may be recovered by any standard technique well known in the art, for example, by centrifugation or filtration. The recovered crystalline particle product, normally termed the "wet filter cake", may then be washed, such as with water, and then dried, such as in air, before being formulated into a catalyst composition. Alternatively, the wet filter cake may be formulated into a catalyst composition directly, that is without any drying, or after only partial drying.

In one embodiment, the molecular sieve that is susceptible to deactivation due to contact with water molecules is contained in a formulated catalyst. In general, formulated molecular sieve catalyst optionally contains binder and matrix materials. Conventionally, formulated catalyst is made by mixing together molecular sieve crystals (which includes template) and a liquid, optionally with matrix material and/or binder, to form a slurry. The slurry is then dried (i.e., liquid is removed), without completely removing the template from the molecular sieve. Since this dried molecular sieve catalyst includes template, it has not been activated, and is considered a preformed catalyst. The catalyst in this form is resistant to catalytic loss by contact with moisture or water. However, the preformed catalyst must be activated before use, and this invention provides appropriate methods to protect the activated catalyst from significant deactivation.

The liquid used to form the slurry can be any liquid conventionally used in formulating molecular sieve catalysts. Non-limiting examples of suitable liquids include water, alcohol, ketones, aldehydes, esters, or a combination thereof. Water is a preferred liquid.

Matrix materials are optionally included in the slurry used to make the formulated molecular sieve catalyst of this invention. Such materials are typically effective as thermal sinks assisting in shielding heat from the catalyst composition, for example, during regeneration. They can further act to densify the catalyst composition, increase catalyst strength such as crush strength and attrition resistance, and to control the rate of conversion in a particular process. Non-limiting examples of matrix materials include one or more of: rare earth metals, metal oxides including titania, zirconia, magnesia, thoria, beryllia, quartz, silica or sols, and mixtures thereof; for example, silica-magnesia, silica-zirconia, silica-titania, silica-alumina and silica-alumina-thoria.

In one embodiment, matrix materials are natural clays, such as those from the families of montmorillonite and kaolin. These natural clays include kaolins known as, for example, Dixie, McNamee, Ga. and Fla. clays. Non-limiting examples of other matrix materials include: halloysite, kaolinite, dickite, nacrite, or anauxite. Optionally, the matrix material, preferably any of the clays, are calcined, acid treated, and/or chemical treated before being used as a slurry component. Under the optional calcination treatment, the matrix material will still be considered virgin material as long as the material has not been previously used in a catalyst formulation.

In a particular embodiment, the matrix material is a clay or a clay-type composition, preferably a clay or clay-type composition having a low iron or titania content, and most preferably the matrix material is kaolin. Kaolin has been found to form a pumpable, high solid content slurry; it has a low fresh surface area, and it packs together easily due to its platelet structure.

Preferably, the matrix material, particularly clay, and preferably kaolin, has an average particle size of from about 0.05 µm to about 0.75 µm; more preferably from about 0.1 µm to about 0.6 µm. It is also desirable that the matrix material have a $d_{90}$ particle size distribution of less than about 1.5 µm, preferably less than about 1 µm.

Binders are also optionally included in the slurry used to make the formulated molecular sieve catalysts of this invention. Such materials act like glue, binding together the molecular sieve crystals and other materials, to form a formulated catalyst composition. Non-limiting examples of binders include various types of inorganic oxide soils such as hydrated aluminas, silicas, and/or other inorganic oxide soils. In one embodiment of the invention, the binder is an alumina-containing sol, preferably aluminium chlorohydrate. Upon calcining, the inorganic oxide sol, is converted into an inorganic oxide matrix component, which is particularly effective in forming a hardened molecular sieve catalyst composition. For example, an alumina sol will convert to an aluminium oxide matrix following heat treatment.

Aluminium chlorohydrate, a hydroxylated aluminium based sol containing a chloride counter ion, also known as aluminium chlorohydrol, has the general formula

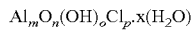

$$Al_mO_n(OH)_oCl_p \cdot x(H_2O)$$

wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., *Stud. Surf. Sci. and Catal.*, 76, pages 105-144, Elsevier, Amsterdam, 1993, which is herein incorporated by reference. In another embodiment, one or more binders are present in combination with one or more other non-limiting examples of alumina materials such as aluminium oxyhydroxide, γ-alumina, boehmite and transitional aluminas such as α-alumina, β-alumina, γ-alumina, δ-alumina, ε-alumina, κ-alumina, and ρ-alumina, aluminium trihydroxide, such as gibbsite, bayerite, nordstrandite, doyelite, and mixtures thereof.

In another embodiment, the binders are alumina soils, predominantly comprising aluminium oxide, optionally including silicon. In yet another embodiment, the binders are peptised alumina made by treating alumina hydrates such as pseudobohemite, with an acid, preferably a non-halogen acid, to prepare soils or aluminium ion solutions. Non-limiting examples of commercially available colloidal alumina soils include Nalco 8676 available from Nalco Chemical Co., Naperville, Ill., and Nyacol available from the Nyacol Nano Technology Inc., Boston, Mass.

If binder is not used in making the molecular sieve catalyst, the catalyst is considered a binderless catalyst. If binder is used, the amount of binder used to prepare the molecular sieve catalyst ranges from about 2% by weight to about 30% by weight, based on the total weight of the binder, the molecular sieve, and optionally included matrix material, excluding the liquid (i.e., after drying). Preferably the amount of binder used to prepare the molecular sieve catalyst ranges from about 5% by weight to about 20% by weight, more preferably from about 7% by weight to about 15% by weight, based on the total weight of the binder, the molecular sieve, and optionally included matrix material, excluding the liquid (i.e., after drying).

Where the catalyst composition contains a binder and a matrix material, the weight ratio of the binder to the matrix material is typically from 1:15 to 1:5, such as from 1:10 to 1:4, and particularly from 1:6 to 1:5. The amount of binder is typically from about 2% by weight to about 30% by weight, such as from about 5% by weight to about 20% by weight, and particularly from about 7% by weight to about 15% by weight, based on the total weight of the binder, the molecular sieve and matrix material. It has been found that a higher sieve content and lower matrix content increases the molecular sieve catalyst composition performance, whereas a lower sieve content and higher matrix content improves the attrition resistance of the composition.

In general, the amount of binder and/or matrix material is such that the formulated molecular sieve catalyst composition contains from about 1% to about 99%, such as from about 10% to about 90%, such as from about 10% to about 80%, for example from about 20% to about 70%, and conveniently from about 25% to about 60% by weight of the molecular sieve, based on the total weight of the formulated molecular sieve catalyst composition.

The molecular sieve crystals are mixed with liquid, and the optional matrix material and/or binder, using conventional techniques to form a slurry. The components can be mixed in any order, and the mixture is thoroughly stirred to form the slurry. The more thorough the stirring, the better the consistency of the slurry.

The mixing of the slurry is preferably sufficient to break any aggregates or large particles into smaller, more uniform particles. In general, the more vigorous the mixing, the smaller the catalyst particles formed in the slurry. Mixing using high-shear mixers is preferred. In general, high-shear mixers are capable of rotating at speeds of at least about 3,000 rpm laboratory scale equivalent.

Solids particle size of the slurry can be indirectly determined by measuring the viscosity of the slurry. In general, the higher the viscosity, the smaller the solids particle size in the slurry. The viscosity of the slurry should not be too high, so that mixing is not effective in breaking apart large particles, or too low, so that drying will not produce acceptable particle formation.

In one embodiment, the slurry has a viscosity of from about 100 cP (0.1 Pa/sec) to about 9,500 cP (9.5 Pa/sec), as measured using a Brookfield LV-DVE viscometer with a No. 3 spindle at 10 rpm. Preferably, the slurry has a viscosity of from about 200 cP (0.2 Pa/sec) to about 8,500 cP (8.5 Pa/sec), and more preferably from about 350 cP (0.375 Pa/sec) to about 8,000 cP (8 Pa/sec), as measured using a Brookfield LV-DVE viscometer with a No. 3 spindle at 10 rpm.

In another embodiment, the slurry has a solids content of from about 10 wt % to about 75 wt %, based on total weight of the slurry. Preferably the slurry has a solids content of from about 15 wt % to about 70 wt %, more preferably from about 20 wt % to about 65 wt %, based on the total weight of the slurry. The solids content can be measured using any conventional means. However, a CEM MAS 700 microwave muffle furnace is particularly preferred to give results consistent with the values recited herein.

In one embodiment, the slurry used to make the formulated molecular sieve catalyst contains binder and matrix material at a weight ratio of from 0:1 to 1:1. Preferably, the slurry used to make the molecular sieve catalyst contains binder and matrix material at a weight ratio of from 1:15 to 1:2, more preferably 1:10 to 1:2, and most preferably 1:6 to 1:1. In case where binders are not used, the molecular sieve component itself acts as a binder.

In formulating the catalyst composition, the molecular sieve and optional binder and/or matrix materials are initially combined in the presence of a liquid to form a slurry typically containing from about 20 weight percent to about 90 weight percent, such as from about 25 weight percent to about 85 weight percent, molecular sieve, based on total weight of the slurry. The liquid used to form the slurry can, for example, be one or a combination of water, an alcohol, a ketone, an aldehyde, and/or an ester, but normally will be water.

Liquid is removed from the slurry containing the molecular sieve crystals to form a preformed molecular sieve catalyst. Preferably, the slurry is fed to a forming unit that produces the preformed molecular sieve catalyst composition. The forming unit may be any conventional unit, such as a spray dryer, pelletizer, extruder, etc. In a preferred embodiment, the forming unit is spray dryer, which removes water from the slurry by a heating or drying process. Preferably, the forming unit is maintained at a temperature sufficient to remove a majority of the liquid from the slurry.

When a spray dryer is used as the forming (or drying) unit, typically, the slurry of the molecular sieve particles, and optional matrix material and/or binder, is fed to the spray drying unit along with a drying gas. The drying gas contacts the slurry and acts to remove water to form the preformed molecular sieve catalyst. Conventional drying conditions can be used. Such conditions include an average inlet temperature ranging from about 150° C. to about 550° C., and an average outlet temperature ranging from about 100° C. to about 250° C.

During spray drying, the slurry is passed through a nozzle distributing the slurry into small droplets, resembling an aerosol spray, into a drying chamber where atomization occurs. Atomization is achieved by forcing the slurry through a single nozzle or multiple nozzles with a pressure drop in the range of from about 100 psia to about 1,000 psia (about 690 kPaa to about 6,895 kPaa). In another embodiment, the slurry is fed through a single nozzle or multiple nozzles along with an atomization or contacting fluid such as air, steam, flue gas, or any other suitable gas.

In yet another embodiment, the slurry that is used to make the preformed catalyst is directed to the perimeter of a spinning wheel that distributes the slurry into small droplets. The size of the droplets is controlled by one or more factors including slurry viscosity, surface tension, flow rate, pressure, and temperature of the slurry; the shape and dimension of the nozzle(s); or the spinning rate of the wheel. These droplets are then dried in a co-current or counter-current flow of air passing through a spray drier to form a preformed molecular sieve catalyst composition. An example of a conventional spray drying process is described in U.S. Pat. No. 4,946,814, which is incorporated herein by reference.

The molecular sieve material is activated by removing the template from the preformed molecular sieve catalyst composition so as to expose the active catalytic sites to the environment. The template can be removed by any conventional technique, including for example by elution methods or by heating. The molecular sieve crystals themselves can be activated for immediate catalytic use or for storing or transporting prior to use. However, it is preferred that the molecular sieves be formulated into a preformed catalyst, then activated, since the sieves are typically most useful as a formulated product. The formulated product generally provides the most effective particle size and hardness for commercial scale equipment.

In one embodiment of the invention, the molecular sieve material is activated by removing the template by heat. In a preferred embodiment, the heat is sufficient to remove water that is formed as a result of the combustion of the template. Preferably, the molecular sieve material is heated at a temperature greater than the critical temperature of water. At this temperature, water formed during the combustion process will not condense or be retained by the molecular sieve. Preferably, the template is removed by contacting with steam at a temperature greater than the critical temperature of water. More preferably, following removal of the template, any water entrained in the catalyst is also removed, preferably by appropriate heating using a dry gas. Preferably, the dry gas has a relative water pressure of less than 0.0001.

Heating to remove template and activate the molecular sieve is generally referred to in this invention as calcination. Conventional calcination devices can be used. Such devices include rotary calciners, fluid bed calciners, batch ovens, and the like. Calcination time is typically dependent on the degree of hardening of the molecular sieve catalyst composition and the temperature.

Conventional calcination temperatures are effective to remove template materials and to activate the molecular sieve catalyst of this invention. Such temperatures are generally in the range from about 400° C. to about 1,000° C., preferably from about 500° C. to about 800° C., and most preferably from about 550° C. to about 700° C.

V. Example of an Olefin Forming Reaction System

In one embodiment of the invention, the reaction system is an olefin forming reaction system in which feedstock is converted into one or more olefin(s). Typically, the feedstock contains one or more aliphatic-containing compounds such that the aliphatic moiety contains from 1 to about 50 carbon atoms, such as from 1 to 20 carbon atoms, for example from 1 to 10 carbon atoms, and particularly from 1 to 4 carbon atoms.

Non-limiting examples of aliphatic-containing compounds include alcohols such as methanol and ethanol, alkyl mercaptans such as methyl mercaptan and ethyl mercaptan, alkyl sulfides such as methyl sulfide, alkylamines such as methylamine, alkyl ethers such as dimethyl ether, diethyl ether and methylethyl ether, alkyl halides such as methyl chloride and ethyl chloride, alkyl ketones such as dimethyl ketone, formaldehydes, and various acids such as acetic acid.

In a preferred embodiment of the process of the invention, the feedstock contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof.

In the most preferred embodiment, the feedstock is selected from one or more of methanol, ethanol, dimethyl ether, diethyl ether or a combination thereof, more preferably methanol and dimethyl ether, and most preferably methanol.

The various feedstocks discussed above, particularly a feedstock containing an oxygenate, more particularly a feedstock containing an alcohol, is converted primarily into one or more olefin(s). The olefin(s) produced from the feedstock typically have from 2 to 30 carbon atoms, preferably 2 to 8 carbon atoms, more preferably 2 to 6 carbon atoms, still more preferably 2 to 4 carbons atoms, and most preferably are ethylene and/or propylene.

The catalyst composition of the invention is particularly useful in the process that is generally referred to as the gas-to-olefins (GTO) process or, alternatively, the methanol-to-olefins (MTO) process. In this process, an oxygenated feedstock, most preferably a methanol-containing feedstock, is converted in the presence of a molecular sieve catalyst composition into one or more olefin(s), preferably and predominantly, ethylene and/or propylene.

Using the catalyst composition of the invention for the conversion of a feedstock, preferably a feedstock containing one or more oxygenates, the amount of olefin(s) produced based on the total weight of hydrocarbon produced is greater than 50 weight percent, typically greater than 60 weight percent, such as greater than 70 weight percent, and preferably greater than 75 weight percent. In one embodiment, the amount of ethylene and/or propylene produced based on the total weight of hydrocarbon product produced is greater than 65 weight percent, such as greater than 70 weight percent, for example greater than 75 weight percent, and preferably greater than 78 weight percent. Typically, the amount ethylene produced in weight percent based on the total weight of hydrocarbon product produced, is greater than 30 weight percent, such as greater than 35 weight percent, for example greater than 40 weight percent. In addition, the amount of propylene produced in weight percent based on the total weight of hydrocarbon product produced is greater than 20 weight percent, such as greater than 25 weight percent, for example greater than 30 weight percent, and preferably greater than 35 weight percent.

In addition to the oxygenate component, such as methanol, the feedstock may contains one or more diluent(s), which are generally non-reactive to the feedstock or molecular sieve catalyst composition and are typically used to reduce the concentration of the feedstock. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, for example water, may be used either in a liquid or a vapor form, or a combination thereof. The diluent may be either added directly to the feedstock entering a reactor or added directly to the reactor, or added with the molecular sieve catalyst composition.

The present process can be conducted over a wide range of temperatures, such as in the range of from about 200° C. to about 1000° C., for example from about 250° C. to about 800° C., including from about 250° C. to about 750° C., conveniently from about 300° C. to about 650° C., typically from about 350° C. to about 600° C. and particularly from about 350° C. to about 550° C.

Similarly, the present process can be conducted over a wide range of pressures including autogenous pressure. Typically the partial pressure of the feedstock exclusive of any diluent therein employed in the process is in the range of from about 0.1 kPaa to about 5 MPaa, such as from about 5 kpaa to about 1 MPaa, and conveniently from about 20 kPaa to about 500 kpaa.

The weight hourly space velocity (WHSV), defined as the total weight of feedstock excluding any diluents per hour per weight of molecular sieve in the catalyst composition, typically ranges from about 1 $hr^{-1}$ to about 5000 $hr^{-1}$, such as from about 2 $hr^{-1}$ to about 3000 $hr^{-1}$, for example from about 5 $hr^{-1}$ to about 1500 $hr^{-1}$, and conveniently from about 10 $hr^{-1}$ to about 1000 $hr^{-1}$. In one embodiment, the WHSV is greater than 20 $hr^{-1}$ and, where feedstock contains methanol and/or dimethyl ether, is in the range of from about 20 $hr^{-1}$ to about 300 $hr^{-1}$.

Where the process is conducted in a fluidized bed, the superficial gas velocity (SGV) of the feedstock including diluent and reaction products within the reactor system, and particularly within a riser reactor(s), is at least 0.1 meter per second (m/sec), such as greater than 0.5 m/sec, such as greater than 1 m/sec, for example greater than 2 m/sec, conveniently greater than 3 m/sec, and typically greater than 4 m/sec. See for example U.S. patent application Ser. No. 09/708,753 filed Nov. 8, 2000, which is herein incorporated by reference.

The process of the invention is conveniently conducted as a fixed bed process, or more typically as a fluidized bed process (including a turbulent bed process), such as a continuous fluidized bed process, and particularly a continuous high velocity fluidized bed process.

The process can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and *Fluidization Engineering*, D. Kunii and O. Levenspiel, Robert E. Krieger Publishing Company, New York, N.Y. 1977, which are all herein fully incorporated by reference.

The preferred reactor types are riser reactors generally described in *Riser Reactor, Fluidization and Fluid-Particle Systems*, pages 48 to 59, F. A. Zenz and D. F. Othmo, Reinhold Publishing Corporation, New York, 1960, and U.S. Pat. No. 6,166,282 (fast-fluidized bed reactor), and U.S. patent application Ser. No. 09/564,613 filed May 4, 2000 (multiple riser reactor), which are all herein fully incorporated by reference.

In one practical embodiment, the process is conducted as a fluidized bed process or high velocity fluidized bed process utilizing a reactor system, a regeneration system and a recovery system.

In such a process the reactor system conveniently includes a fluid bed reactor system having a first reaction zone within one or more riser reactor(s) and a second reaction zone within at least one disengaging vessel, typically comprising one or more cyclones. In one embodiment, the one or more riser reactor(s) and disengaging vessel are contained within a single reactor vessel. Fresh feedstock, preferably containing one or more oxygenates, optionally with one or more diluent(s), is fed to the one or more riser reactor(s) into which a molecular sieve catalyst composition or coked version thereof is introduced. In one embodiment, prior to being introduced to the riser reactor(s), the molecular sieve catalyst composition or coked version thereof is contacted with a liquid, preferably water or methanol, and/or a gas, for example, an inert gas such as nitrogen.

In an embodiment, the amount of fresh feedstock fed as a liquid and/or a vapor to the reactor system is in the range of from 0.1 weight percent to about 99.9 weight percent, such as from about 1 weight percent to about 99 weight percent, more typically from about 5 weight percent to about 95 weight percent based on the total weight of the feedstock including any diluent contained therein. The liquid and vapor feedstocks may be the same composition, or may contain varying proportions of the same or different feedstocks with the same or different diluents.

The feedstock entering the reactor system is preferably converted, partially or fully, in the first reactor zone into a gaseous effluent that enters the disengaging vessel along with the coked catalyst composition. In the preferred embodiment, cyclone(s) are provided within the disengaging vessel to separate the coked catalyst composition from the gaseous effluent containing one or more olefin(s) within the disengaging vessel. Although cyclones are preferred, gravity effects within the disengaging vessel can also be used to separate the catalyst composition from the gaseous effluent. Other methods for separating the catalyst composition from the gaseous effluent include the use of plates, caps, elbows, and the like.

In one embodiment, the disengaging vessel includes a stripping zone, typically in a lower portion of the disengaging vessel. In the stripping zone the coked catalyst composition is contacted with a gas, preferably one or a combination of steam, methane, carbon dioxide, carbon monoxide, hydrogen, or an inert gas such as argon, preferably steam, to recover adsorbed hydrocarbons from the coked catalyst composition that is then introduced to the regeneration system.

The coked catalyst composition is withdrawn from the disengaging vessel and introduced to the regeneration system. The regeneration system comprises a regenerator where the coked catalyst composition is contacted with a regeneration medium, preferably a gas containing oxygen, under conventional regeneration conditions of temperature, pressure and residence time.

Non-limiting examples of suitable regeneration media include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. Suitable regeneration conditions are those capable of burning coke from the coked catalyst composition, preferably to a level less than 0.5 weight percent based on the total weight of the coked molecular sieve catalyst composition entering the regeneration system. For example, the regeneration temperature may be in the range of from about 200° C. to about 1500° C., such as from about 300° C. to about 1000° C., for example from about 450° C. to about 750° C., and conveniently from about 550° C. to 700° C. The regeneration pressure may be in the range of from about 15 psia (103 kpaa) to about 500 psia (3448 kPaa), such as from about 20 psia (138 kPaa) to about 250 psia (1724 kPaa), including from about 25 psia (172 kPaa) to about 150 psia (1034 kpaa), and conveniently from about 30 psia (207 kPaa) to about 60 psia (414 kpaa).

The residence time of the catalyst composition in the regenerator may be in the range of from about one minute to several hours, such as from about one minute to 100 minutes. The amount of oxygen in the regeneration flue gas (i.e., gas which leaves the regenerator) may be in the range of from about 0.01 mole percent to about 5 mole percent based on the total volume of the gas. The amount of oxygen in the gas used to regenerate the coked catalyst (i.e., fresh or feed gas) is typically at least about 15 mole percent, preferably at least about 20 mole percent, and more preferably from about 20 mole percent to about 30 mole percent, based on total amount of regeneration gas fed to the regenerator.

The burning of coke in the regeneration step is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated catalyst composition from the regeneration system and passing it through a catalyst cooler to form a cooled regenerated catalyst composition. The catalyst cooler, in an embodiment, is a heat exchanger that is located either internal or external to the regeneration system. Other methods for operating a regeneration system are in disclosed U.S. Pat. No. 6,290,916 (controlling moisture), which is herein fully incorporated by reference.

The regenerated catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the riser reactor(s). In one embodiment, the regenerated catalyst composition withdrawn from the regeneration system is returned to the riser reactor(s) directly, preferably after passing through a catalyst cooler. A carrier, such as an inert gas, feedstock vapor, steam or the like, may be used, semi-continuously or continuously, to facilitate the introduction of the regenerated catalyst composition to the reactor system, preferably to the one or more riser reactor(s).

By controlling the flow of the regenerated catalyst composition or cooled regenerated catalyst composition from the regeneration system to the reactor system, the optimum level of coke on the molecular sieve catalyst composition entering the reactor is maintained. There are many techniques for controlling the flow of a catalyst composition described in Michael Louge, *Experimental Techniques, Circulating Fluidized Beds*, Grace, Avidan and Knowlton, eds., Blackie, 1997 (336-337), which is herein incorporated by reference.

Coke levels on the catalyst composition are measured by withdrawing the catalyst composition from the conversion process and determining its carbon content. Typical levels of coke on the molecular sieve catalyst composition, after regeneration, are in the range of from 0.01 weight percent to about 15 weight percent, such as from about 0.1 weight percent to about 10 weight percent, for example from about 0.2 weight percent to about 5 weight percent, and conveniently from about 0.3 weight percent to about 2 weight percent based on the weight of the molecular sieve.

The gaseous effluent is withdrawn from the disengaging system and is passed through a recovery system. There are many well known recovery systems, techniques and sequences that are useful in separating olefin(s) and purifying olefin(s) from the gaseous effluent. Recovery systems generally comprise one or more or a combination of various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment, for example various condensers, heat exchangers, refrigeration systems or chill trains, compressors, knock-out drums or pots, pumps, and the like.

Non-limiting examples of these towers, columns, splitters or trains used alone or in combination include one or more of a demethanizer, preferably a high temperature demethanizer, a dethanizer, a depropanizer, a wash tower often referred to as a caustic wash tower and/or quench tower, absorbers, adsorbers, membranes, ethylene (C2) splitter, propylene (C3) splitter and butene (C4) splitter.

Various recovery systems useful for recovering olefin(s), such as ethylene, propylene and/or butene, are described in U.S. Pat. No. 5,960,643 (secondary rich ethylene stream), U.S. Pat. Nos. 5,019,143, 5,452,581 and 5,082,481 (membrane separations), U.S. Pat. No. 5,672,197 (pressure dependent adsorbents), U.S. Pat. No. 6,069,288 (hydrogen removal), U.S. Pat. No. 5,904,880 (recovered methanol to hydrogen and carbon dioxide in one step), U.S. Pat. No. 5,927,063 (recovered methanol to gas turbine power plant), and U.S. Pat. No. 6,121,504 (direct product quench), U.S. Pat. No. 6,121,503 (high purity olefins without superfractionation), and U.S. Pat. No. 6,293,998 (pressure swing adsorption), which are all herein fully incorporated by reference.

Other recovery systems that include purification systems, for example for the purification of olefin(s), are described in *Kirk-Othmer Encyclopedia of Chemical Technology*, 4th Edition, Volume 9, John Wiley & Sons, 1996, pages 249-271 and 894-899, which is herein incorporated by reference. Purification systems are also described in for example, U.S. Pat. No. 6,271,428 (purification of a diolefin hydrocarbon stream), U.S. Pat. No. 6,293,999 (separating propylene from propane), and U.S. patent application Ser. No. 09/689,363 filed Oct. 20, 2000 (purge stream using hydrating catalyst), which are herein incorporated by reference.

Generally accompanying most recovery systems is the production, generation or accumulation of additional products, by-products and/or contaminants along with the preferred prime products. The preferred prime products, the light olefins, such as ethylene and propylene, are typically purified for use in derivative manufacturing processes such as polymerization processes. Therefore, in the most preferred embodiment of the recovery system, the recovery system also includes a purification system. For example, the light olefin(s) produced particularly in a MTO process are passed through a purification system that removes low levels of by-products or contaminants.

Non-limiting examples of contaminants and by-products include generally polar compounds such as water, alcohols, carboxylic acids, ethers, carbon oxides, sulfur compounds such as hydrogen sulfide, carbonyl sulfides and mercaptans, ammonia and other nitrogen compounds, arsine, phosphine and chlorides. Other contaminants or by-products include hydrogen and hydrocarbons such as acetylene, methyl acetylene, propadiene, butadiene and butyne.

Typically, in converting one or more oxygenates to olefin(s) having 2 or 3 carbon atoms, aminor amount hydrocarbons, particularly olefin(s), having 4 or more carbon atoms is also produced. The amount of $C_4+$ hydrocarbons is normally less than 20 weight percent, such as less than 10 weight percent, for example less than 5 weight percent, and particularly less than 2 weight percent, based on the total weight of the effluent gas withdrawn from the process, excluding water. Typically, therefore the recovery system may include one or more reaction systems for converting the $C_4+$ impurities to useful products.

Non-limiting examples of such reaction systems are described in U.S. Pat. No. 5,955,640 (converting a four carbon product into butene-1), U.S. Pat. No. 4,774,375 (isobutane and butene-2 oligomerized to an alkylate gasoline), U.S. Pat. No. 6,049,017 (dimerization of n-butylene), U.S. Pat. Nos. 4,287,369 and 5,763,678 (carbonylation or hydroformulation of higher olefins with carbon dioxide and hydrogen making carbonyl compounds), U.S. Pat. No. 4,542,252 (multistage adiabatic process), U.S. Pat. No. 5,634,354 (olefin-hydrogen recovery), and Cosyns, J. et al., *Process for Upgrading C3, C4 and C5 Olefinic Streams*, Pet. & Coal, Vol. 37, No. 4 (1995) (dimerizing or oligomerizing propylene, butylene and pentylene), which are all fully herein incorporated by reference.

The preferred light olefin(s) produced by any one of the processes described above are high purity prime olefin(s) products that contain a single carbon number olefin in an amount greater than 80 percent, such as greater than 90 weight percent, such as greater than 95 weight percent, for example at least about 99 weight percent, based on the total weight of the olefin.

In one practical embodiment, the process of the invention forms part of an integrated process for producing light olefin(s) from a hydrocarbon feedstock, preferably a gaseous hydrocarbon feedstock, particularly methane and/or ethane. The first step in the process is passing the gaseous feedstock, preferably in combination with a water stream, to a syngas production zone to produce a synthesis gas (syngas) stream, typically comprising carbon dioxide, carbon monoxide and hydrogen. Syngas production is well known, and typical syngas temperatures are in the range of from about 700° C. to about 1200° C. and syngas pressures are in the range of from about 2 MPa to about 100 MPa. Synthesis gas streams are produced from natural gas, petroleum liquids, and carbonaceous materials such as coal, recycled plastic, municipal waste or any other organic material. Preferably synthesis gas stream is produced via steam reforming of natural gas.

The next step in the process involves contacting the synthesis gas stream generally with a heterogeneous catalyst, typically a copper based catalyst, to produce an oxygenate containing stream, often in combination with water. In one embodiment, the contacting step is conducted at temperature in the range of from about 150° C. to about 450° C. and a pressure in the range of from about 5 MPa to about 10 MPa.

This oxygenate containing stream, or crude methanol, typically contains the alcohol product and various other components such as ethers, particularly dimethyl ether, ketones, aldehydes, dissolved gases such as hydrogen methane, carbon oxide and nitrogen, and fuel oil. The oxygenate containing stream, crude methanol, in the preferred embodiment is passed through a well known purification processes, distillation, separation and fractionation, resulting in a purified oxygenate containing stream, for example, commercial Grade A and AA methanol.

The oxygenate containing stream or purified oxygenate containing stream, optionally with one or more diluents, can then be used as a feedstock in a process to produce light olefin(s), such as ethylene and/or propylene. Non-limiting examples of this integrated process are described in EP-B-0 933 345, which is herein fully incorporated by reference.

In another more fully integrated process, that optionally is combined with the integrated processes described above, the olefin(s) produced are directed to, in one embodiment, one or more polymerization processes for producing various polyolefins. (See for example U.S. patent application Ser. No. 09/615,376 filed Jul. 13, 2000, which is herein fully incorporated by reference.)

Polymerization processes include solution, gas phase, slurry phase and a high pressure processes, or a combination thereof. Particularly preferred is a gas phase or a slurry phase polymerization of one or more olefin(s) at least one of which is ethylene or propylene. These polymerization processes utilize a polymerization catalyst that can include any one or a combination of the molecular sieve catalysts discussed above. However, the preferred polymerization catalysts are the Ziegler-Natta, Phillips-type, metallocene, metallocene-type and advanced polymerization catalysts, and mixtures thereof.

In a preferred embodiment, the integrated process comprises a process for polymerizing one or more olefin(s) in the presence of a polymerization catalyst system in a polymerization reactor to produce one or more polymer products, wherein the one or more olefin(s) have been made by converting an alcohol, particularly methanol, using a molecular sieve catalyst composition as described above. The preferred polymerization process is a gas phase polymerization process and at least one of the olefins(s) is either ethylene or propylene, and preferably the polymerization catalyst system is a supported metallocene catalyst system. In this embodiment, the supported metallocene catalyst system comprises a support, a metallocene or metallocene-type compound and an activator, preferably the activator is a non-coordinating anion or alumoxane, or combination thereof, and most preferably the activator is alumoxane.

The polymers produced by the polymerization processes described above include linear low density polyethylene, elastomers, plastomers, high density polyethylene, low density polyethylene, polypropylene and polypropylene copolymers. The propylene based polymers produced by the polymerization processes include atactic polypropylene, isotactic polypropylene, syndiotactic polypropylene, and propylene random, block or impact copolymers.

VI. EXAMPLES OF STARTING UP A REACTION SYSTEM HAVING A REACTOR UNIT AND REGENERATOR UNIT

A. Example 1

One example of starting up a system containing molecular sieve catalyst that is susceptible to deactivation due to contact with water molecules is described in accordance with FIG. 1, which is a flow diagram of a reaction system, containing a reactor 102 and a regenerator 104. The flow diagram of FIG. 1 is particularly directed to a system for converting oxygenates to olefins, although it is particularly relevant to any system which incorporates a reactor and regenerator. According to the embodiment shown in FIG. 1, the regenerator 104 is heated by injecting hot air. Air is input to the regenerator 104 by sending the air through a compressor 106, through a conduit 108, to a heater or a burner 110, and into the regenerator 104 by way of a conduit 112. The regenerator 104 is heated for 8 hours at 400° F. (204° C.) at which time refractory in the regenerator 104 will be substantially dry.

While the regenerator 104 is being heated, the reactor 102 is also heated by injecting superheated steam through a conduit 114 and into regenerator 102. The reactor 102 is heated for 8 hours at 400° F. (204° C.) at which time refractory in the reactor 102 will be substantially dry. After the reactor 102 has been heated for a time to substantially dry out the refractory materials, the reactor 102 is heated to a reactor temperature of about 800° F. (427° C.) by injecting superheated steam through the conduit 114.

While the reactor 102 is heated, and after the regenerator 104 has been heated for a time to substantially dry out the refractory materials, the temperature of the heated air into the regenerator 104 is increased to reach a regenerator bed temperature of about 800° F. (427° C.). Once this bed temperature is reached, catalyst is added to the regenerator 104 by a conventional hopper and conduit system through an upper portion of the regenerator 104 (conventional hopper and conduit system not shown).

After sufficient catalyst is loaded into the regenerator 104 to form a bed, the bed is further heated by injecting a hydrocarbon oil into the bed through a conduit 116. The bed will be sufficiently hot to combust the oil, thereby further increasing temperature of the catalyst.

Once a predetermined amount of catalyst is input into the regenerator 104 and heated to between about 800° F. (427° C.) and about 1200° F. (649° C.), the catalyst is circulated to the reactor 102 through a conduit 118, and back from the reactor 102 through a conduit 120. A lift gas such as air is also injected through the conduit 120 to aid in circulation. Additional catalyst is then added to the regenerator to complete the catalyst loading. The catalyst is added at a rate to maintain the system above about 800° F. (427° C.).

Once the reaction system is sufficiently heated, injection of air into the reactor 102 is stopped so that steam or other appropriate gas is used to sufficiently purge the reactor 102 of oxygen prior to injection of feed. After appropriate purge of oxygen from reactor 102, hydrocarbon feed is injected through the conduit 114 to contact the circulating hot catalyst, and the reaction process begins. Reaction product is separated from the circulating catalyst by way of cyclone separators 122, with the reaction product exiting the reactor 102 through a conduit 124. A portion of the catalyst is removed from reactor 102 by way of the conduit 120 and sent to the regenerator 104 for regeneration. Combustion products are removed from the regenerator 104 by way of a conduit 126.

B. Example 2

Figure 2:
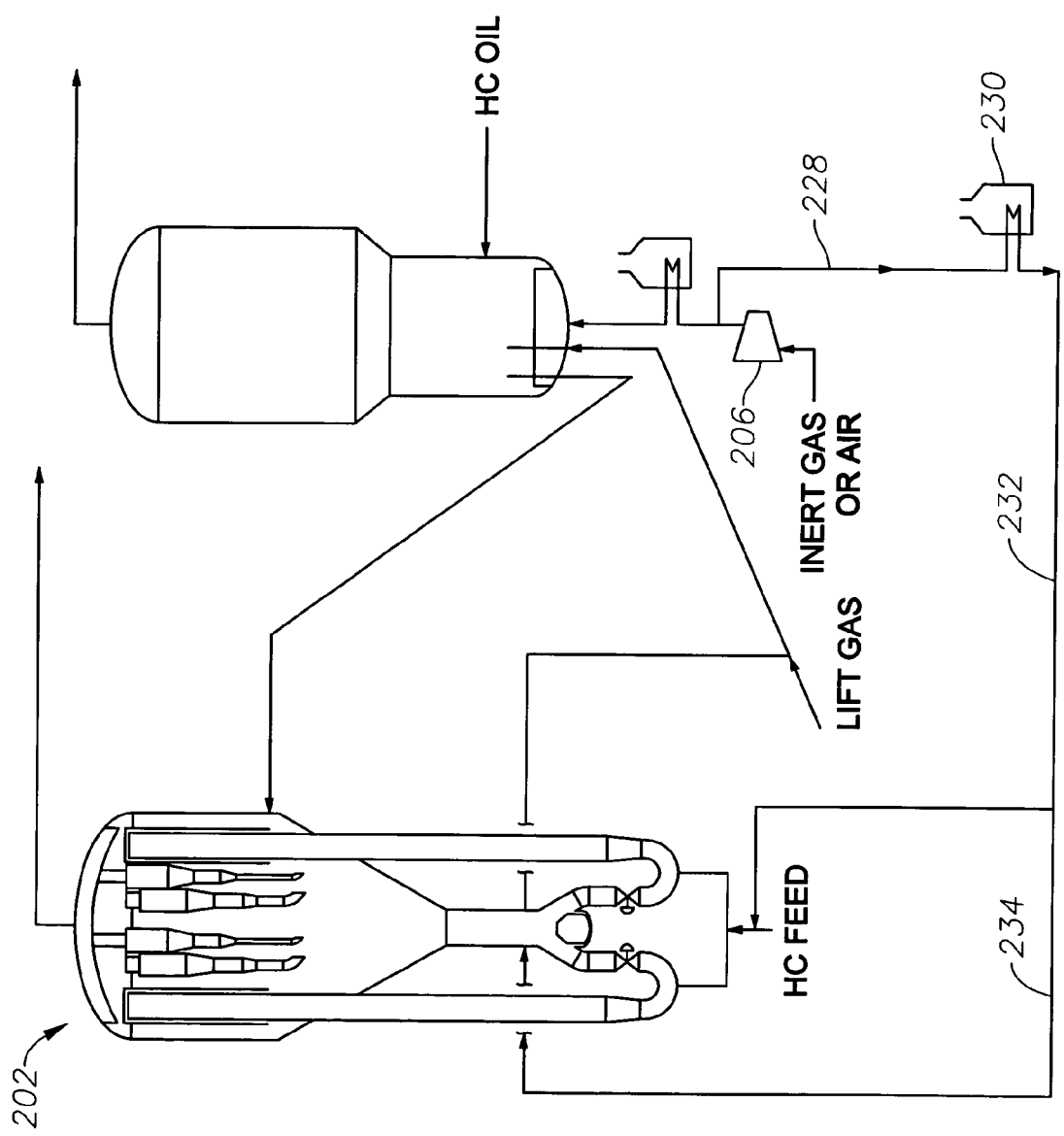
FIG. 2 is flow diagram of a reaction system comprising a reactor unit and a regenerator, the regenerator and reactor being heated by air or gas rather than by steam.

Another example of starting up a reaction system containing molecular sieve catalyst that is susceptible to deactivation due to contact with water molecules is described in accordance with FIG. 2, which is a flow diagram of a reaction system as shown in FIG. 1. According to FIG. 2, the heat up procedure is the same as that in Example 1, except that relatively dry gas is used to heat reactor 202 rather than steam. According to FIG. 2, a portion the air sent through air compressor 206 is sent through a conduit 228 to dry out heater 230 to heat the air to the appropriate temperatures as stated in Example 1. As a result of increasing the temperature of the air, the air is at a low relative water pressure, and is considered substantially dry. This dry air is sent to the reactor 202 by way of conduits 232 and 234, and the start up procedure of Example 1 is followed.

C. Example 3

Figure 3:
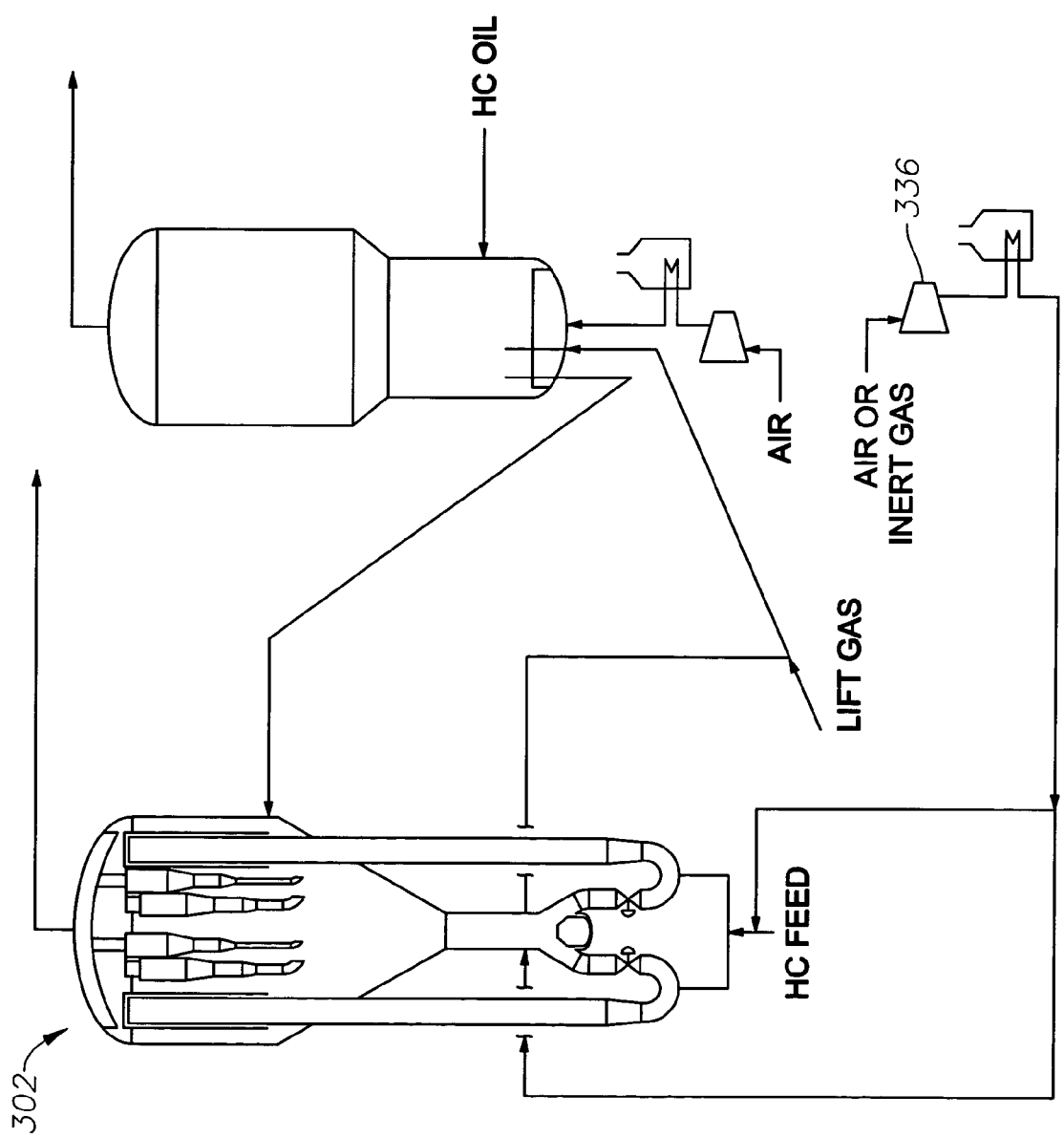
FIG. 3 is flow diagram of a reaction system comprising a reactor unit and a regenerator, the regenerator and reactor being heated by air or gas from two different sources.

Another example of starting up a reaction system containing molecular sieve catalyst that is susceptible to deactivation due to contact with water molecules is described in accordance with FIG. 3, which is a flow diagram of a reaction system as shown in FIG. 2. According to FIG. 3, the heat up procedure is the same as that in Example 2, except that air or gas from another source is sent to a separate compressor 336, before being heated and sent to reactor 302. All other aspects of the start up procedure pertaining to FIG. 3 are the same as in Example 2.

D. Example 4

Figure 4:
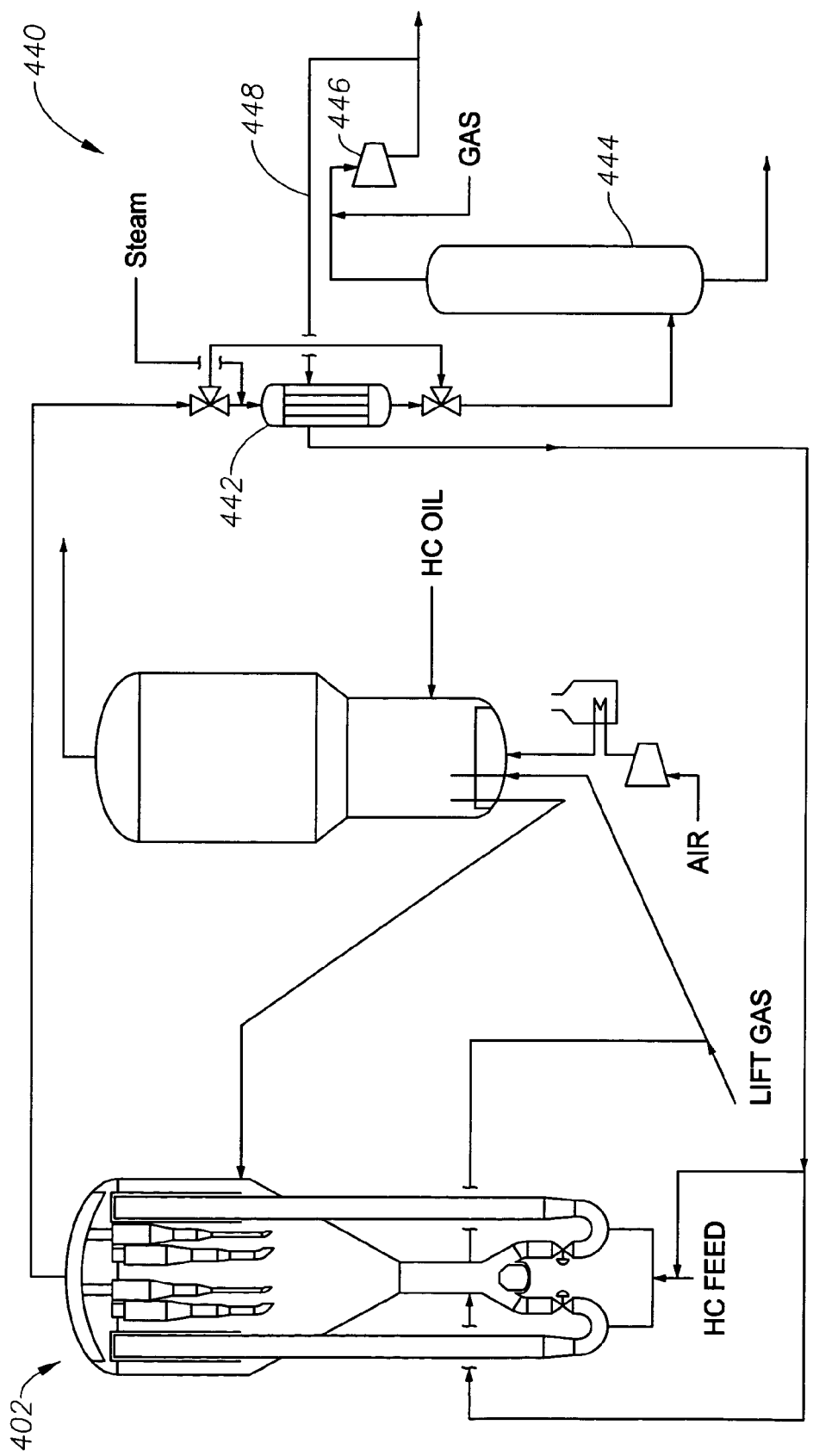
FIG. 4 is flow diagram of a reaction system comprising a reactor unit and a regenerator, the regenerator being heated by air, and the reactor being heated by a gas that is heated using equipment in a recovery section of the reaction system.

Another example of starting up a reaction system containing molecular sieve catalyst that is susceptible to deactivation due to contact with water molecules is described in accordance with FIG. 4, which is a flow diagram of a reaction system as shown in FIG. 1. According to FIG. 4, the heat up procedure is the same as that in Example 1, except that gas (e.g., air) is used to heat up reactor 402 rather than steam. The gas is sent to a product recovery unit 440 of the reaction system, heated and sent to reactor 402. The product recovery system includes cooler or steam generator 442, collection or quench vessel 444, and compressor 446. According to FIG. 4, the gas is sent to the compressor 446 passed through a conduit 448, and sent to the steam generator 442. In a reaction operation such as a catalytic cracking system or an oxygenate to olefins system, the steam generator 442 would typically be used to cool product from the reactor 402, and to produce steam.

As shown in FIG. 4, the steam generator 442 is also arranged so that at start up the gas passing through the steam generator 442 is heated indirectly using the steam as a heating medium. The heated gas then passes to the reactor 402 in similar manner as that shown in FIG. 2 and FIG. 3. An advantage of the arrangement in FIG. 4 is that the gas can be circulated in a relatively dry form through the reaction system, without having to use an additional dry out heater to heat the gas.

Having now fully described this invention, it will be appreciated by those skilled in the art that the invention can be performed within a wide range of parameters within what is claimed, without departing from the spirit and scope of the invention.

The invention claimed is:

1. A process of starting up a reaction system, the process comprising the steps of:
    a) heating at least a portion of the reaction system;
    b) loading a catalyst, the catalyst comprising activated metalloaluminophosphate molecular sieve, into a heated portion of the reaction system, wherein the catalyst loaded into the reaction system is maintained at a predetermined catalytic activity index while the sieve is in the reaction system, with the catalytic activity index being defined as $CAI = \exp(f(T) * f(PP_{water})^n * \text{alpha} * t)$ wherein
    t=time of contact of catalyst with water (hours)
    T=temperature at contact (° C.)
    $PP_{water}$=Partial Pressure of water in contact gas (psia)
    alpha=−0.071
    n=3.5
    $f(T) = \exp(ea(1/(T+273) - n\ 1/(T_o+273)))$
    ea=−5500° K.
    $T_o$=200° C.
    $f((PP_{water})) = (26.2 * PP_{water}/P_{sat} + 1.14) * 0.175$, for T≦180° C. (453° K.)
    $f(PP_{water}) = ((26.2 + 0.272 * (180-T)) * PP_{water}/P_{sat} + 1.14) * 0.175$,
    for 180° C. (453° K.)>T≧150° C. (433° K.)
    $P_{sat}$=Saturation pressure of water at T (psia);
    c) heating the catalyst loaded into the reaction system; and
    d) contacting the heated catalyst with feed in the reaction system.

2. The process of claim 1, wherein the reaction system is a dense bed reaction system, fixed bed reaction system, fluidized bed reaction system. fast fluidized bed reaction system, circulating fluidized bed reaction system, or riser reactor system.

3. The process of claim 1, wherein the reaction system further comprises a reactor and regenerator.

4. The process of claim 3, wherein the catalyst is loaded into the regenerator, further heated in the regenerator, and circulated to the reactor prior to contacting with feed.

5. The process of claim 3, wherein the reactor is a hot wall or cold wall reactor.

6. The process of claim 1, wherein the heated portion of the reaction system into which the activated metalloaluminophosphate molecular sieve is loaded is heated to a temperature of at least 150° C. prior to catalyst loading.

7. The process of claim 6, wherein the heated portion of the reaction system into which the activated metalloaluminophosphate molecular sieve is loaded is heated to a temperature of at least 200° C. prior to catalyst loading.

8. The process of claim 7, wherein the heated portion of the reaction system into which the activated metalloaluminophosphate molecular sieve is loaded is heated to a temperature of at least 300° C. prior to catalyst loading.

9. The process of claim 8, wherein the heated portion of the reaction system into which the activated metalloaluminophosphate molecular sieve is loaded is heated to a temperature of at least water critical temperature prior to catalyst loading.

10. The process of claim 1, wherein the predetermined catalytic activity index is at least 0.7.

11. The process of claim 10, wherein the predetermined catalytic activity index is at least 0.8.

12. The process of claim 11, wherein the predetermined catalytic activity index is at least 0.9.

13. The process of claim 1, wherein the metalloaluminophosphate molecular sieve is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AlPO-5, AlPO-11, AlPO-18, AlPO-31, AlPO-34, AlPO-36, AlPO-37, AlPO-46, metal containing molecular sieves thereof, and mixtures thereof.

14. The process of claim 1, wherein the feed comprises oxygenates.

15. The process of claim 1, wherein the catalyst loaded into the reaction system is heated to a temperature that is at least 100° C. higher than when first loaded into the reaction system.

16. The process of claim 1, wherein the catalyst loaded into the reaction system is heated to a temperature of at least 400° C.

17. The process of claim 1, wherein the catalyst loaded into the reaction system is heated by combusting hydrocarbon oil in the reaction system.

18. The process of claim 1, wherein the reaction system is selected from the group consisting of systems for converting oxygenates to olefins and systems for converting oxygenates to aromatics.

19. The process of claim 1, wherein the activated metalloaluminophosphate molecular sieve is a silicoaluminophosphate having a Si/Al ratio of not greater than 0.5.

20. The process of claim 19, wherein the activated metalloaluminophosphate molecular sieve is a silicoaluminophosphate having a Si/Al ratio of not greater than 0.3.

21. The process of claim 20, wherein the activated metalloaluminophosphate molecular sieve is a silicoaluminophosphate having a Si/Al ratio of not greater than 0.2.

22. The process of claim 21, wherein the activated metalloaluminophosphate molecular sieve is a silicoaluminophosphate having a Si/Al ratio of not greater than 0.15.

23. The process of claim 22, wherein the activated metalloaluminophosphate molecular sieve is a silicoaluminophosphate having a Si/Al ratio of not greater than 0.1.

24. A process of starting up a reactor system having a reactor and regenerator, the process comprising the steps of:
  a) heating the reactor and regenerator;
  b) loading catalyst, the catalyst comprising activated metalloaluminophosphate molecular sieve, into the heated reactor or regenerator, wherein the catalyst loaded into the reaction system maintained at a predetermined catalytic activity index while the sieve is in the reaction system, with the catalytic activity index being defined as $$CAI = \exp(f(T) * f(PP_{water})^n * alpha * t)$$

wherein
t=time of contact of catalyst with water (hours)
T=temperature at contact (° C.)
$PP_{water}$=Partial Pressure of water in contact gas (psia)
alpha=−0.071
n=3.5
$f(T) = \exp(ea(1/(T+273) - 1/(T_o+273)))$
ea=−5500° K.
$T_o$=200° C.
$f(PP_{water}) = ((26.2* \ PP_{water}/P_{sat} + 1.14) * 0.175$, for $T \geq 180°$ C. (453° K.)
$f(PP_{water}) = ((26.2+0.272*(180-T)) * PP_{water}/P_{sat}+1.14) * 0.175$.
for 180° C. (453° K.)>T≧150° C. (453° K.)
$P_{sat}$=Saturation pressure of water at T (psia);
  c) beating the catalyst loaded into the reactor or regenerator; and
  d) contacting the heated catalyst with feed in the heated reactor.

25. The process of claim 24, wherein the catalyst is loaded into the regenerator, further heated in the regenerator, and circulated to the reactor prior to contacting with feed.

26. The process of claim 25, wherein the reactor is a hot wall or cold wall reactor.

27. The process of claim 24, wherein the reactor or regenerator into which the activated metalloaluminophosphate molecular sieve is loaded is heated to a temperature of at least 150° C. prior to catalyst loading.

28. The process of claim 27, wherein the reactor or regenerator into which the activated metalloaluminophosphate molecular sieve is loaded is heated to a temperature of at least 200° C. prior to catalyst loading.

29. The process of claim 28, wherein the reactor or regenerator into which the activated metalloaluminophosphate molecular sieve is loaded is heated to a temperature of at least 300° C. prior to catalyst loading.

30. The process of claim 29, wherein the reactor or regenerator into which the activated metalloaluminophosphate molecular sieve is loaded is heated to a temperature of at least water critical temperature prior to catalyst loading.

31. The process of claim 24, wherein the predetermined catalytic activity index is at least 0.7.

32. The process of claim 31, wherein the predetermined catalytic activity index is at least 0.8.

33. The process of claim 32, wherein the predetermined catalytic activity index is at least 0.9.

34. The process of claim 24, wherein the metalloaluminophosphate molecular sieve is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AlPO-5, AlPO-11, AlPO-18, AlPO-31, AlPO-34, AlPO-36, AlPO-37, AlPO-46, metal containing molecular sieves thereof, and mixtures thereof.

35. The process of claim 24, wherein the feed comprises exygenates.

36. The process of claim 24, wherein the catalyst loaded into the reactor or regenerator is heated to a temperature that is at least 100° C. higher than when first loaded into the reaction system.

37. The process of claim 24, wherein the catalyst loaded into the reactor or regenerator is heated to a temperature of at least 400° C.

38. The process of claim 24, wherein the catalyst loaded into the reactor or regenerator is heated by combusting hydrocarbon oil in the reactor or regenerator.

39. The process of claim 24, wherein the reaction system is selected from the group consisting of systems for converting oxygenates to olefins and systems for convening oxygenates to aromatics.

40. The process of claim 24, wherein the activated metalloaluminophosphate molecular sieve is a silicoaluminophosphate having a Si/Al ratio of not greater than 0.5.

41. The process of claim 40, wherein the activated metalloaluminophosphate molecular sieve is a silicoaluminophosphate having a Si/Al ratio of not greater than 0.3.

42. The process of claim 41, wherein the activated metalloaluminophosphate molecular sieve is a silicoaluminophosphate having a Si/Al ratio of not greater than 0.2.

43. The process of claim 42, wherein the activated metalloaluminophosphate molecular sieve is a silicoaluminophosphate having a Si/Al ratio of not greater than 0.15.

44. The process of claim 43, wherein the activated metalloaluminophosphate molecular sieve is a silicoaluminophosphate having a Si/Al ratio of not greater than 0.1.

45. A process of starting up a fluidized bed reactor system having a reactor in connection with a regenerator, the process comprising the steps of:
  a) heating the reactor and regenerator;
  b) loading catalyst, the catalyst comprising activated metalloaluminophosphate molecular sieve, into the heated regenerator, wherein the catalyst loaded into the reaction system is maintained at a predetermined catalytic activity index while the sieve is in the reaction system, with the catalytic activity index being defined as $$CAI = \exp(f(T) * f(PP_{water})^n * alpha * t)$$

wherein
t=time of contact of catalyst with water (hours)
T=temperature at contact (° C.)
$PP_{water}$=Partial Pressure of water in contact gas (psia)
alpha=−0.071
n=3.5
$f(T) = \exp(ea(1/(T+273) - 1/(T_o+273)))$
ea=−5500° K.
$T_o$=200° C.
$f(PP_{water}) = (26.2* \ PP_{water}/P_{sat}+1.14) * 0.175$, for T 180° C. (453° K.)
$f(PP_{water}) = ((26.2+0172*(180-T)) * PP_{water}/P_{sat}+1.14) * 0.175$.
for 180° C. (453° K.)>T≧150° C. (433° K.)

P$_{sat}$=Saturation pressure of water at T (psia);

c) heating the catalyst loaded into the regenerator;

d) circulating the heated catalyst between the regenerator arid reactor; and e) contacting the heated catalyst with feed in the heated reactor.

46. The process of claim 45, wherein the reactor is a hot wall or cold wall reactor.

47. The process of claim 45, wherein the regenerator into which the activated metalloaluminophosphate molecular sieve is loaded is heated to a temperature of at least 150° C. prior to catalyst loading.

48. The process of claim 47, wherein the regenerator into which the activated metalloaluminophosphate molecular sieve is loaded is heated to a temperature of at least 200° C. prior to catalyst loading.

49. The process of claim 48, wherein the regenerator into which the activated metalloaluminophosphate molecular sieve is loaded is heated to a temperature of at least 300° C. prior to catalyst loading.

50. The process of claim 49, wherein the regenerator into which the activated metalloaluminophosphate molecular sieve is loaded is heated to a temperature of at least water critical temperature prior to catalyst loading.

51. The process of claim 45, wherein the predetermined catalytic activity index is at least 0.7.

52. The process of claim 51, wherein the predetermined catalytic activity index is at least 0.8.

53. The process of claim 52, wherein the predetermined catalytic activity index is at least 0.9.

54. The process of claim 45, wherein the metalloaluminophosphate molecular sieve is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AlPO-5, AlPO-11, AlPO-18, AlPO-31, AlPO-34, AlPO-36, AlPO-37, AlPO-46, metal containing molecular sieves thereof, and mixtures thereof.

55. The process of claim 45, wherein the feed comprises oxygenates.

56. The process of claim 45, wherein the catalyst loaded into the regenerator is heated to a temperature that Is at least 100° C. higher than when first loaded into the regenerator.

57. The process of claim 45, wherein the catalyst loaded into the regenerator is heated to a temperature of at least 400° C.

58. The process of claim 45, wherein the catalyst loaded into the regenerator is heated by combusting hydrocarbon oil in the regenerator.

59. The process of claim 45, wherein the reaction system is selected from the group consisting of systems for converting oxygenates to olefins and systems for converting oxygenates to aromatics.

60. The process of claim 45, wherein the heated catalyst is circulated to the regenerator using a lift gas.

61. The process of claim 60, wherein the lift gas is selected from the group consisting of air, nitrogen, helium, flue gas, CO2, fuel gas, and any combination thereof.

62. The process of claim 45, wherein the activated metalloaluminophosphate molecular sieve is a silicoaluminophosphate having a Si/Al ratio of not greater than 0.5.

63. The process of claim 62, wherein the activated metalloaluminophosphate molecular sieve is a silicoaluminophosphate having a Si/Al ratio of not greater than 0.3.

64. The process of claim 63, wherein the activated metalloaluminophosphate molecular sieve is a silicoaluminophosphate having a Si/Al ratio of not greater than 0.2.

65. The process of claim 64, wherein the activated metalloaluminophosphate molecular sieve is a silicoaluminophosphate having a Si/Al ratio of not greater than 0.15.

66. The process of claim 65, wherein the activated metalloaluminophosphate molecular sieve is a silicoaluminophosphate having a Si/Al ratio of not greater than 0.1.

* * * * *